US008879847B2

(12) United States Patent
Kano et al.

(10) Patent No.: US 8,879,847 B2
(45) Date of Patent: Nov. 4, 2014

(54) IMAGE PROCESSING DEVICE, METHOD OF CONTROLLING IMAGE PROCESSING DEVICE, AND PROGRAM FOR ENABLING COMPUTER TO EXECUTE SAME METHOD

(75) Inventors: Natsuki Kano, Tokyo (JP); Yasutaka Hirasawa, Tokyo (JP)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/527,905

(22) Filed: Jun. 20, 2012

(65) Prior Publication Data
US 2013/0004082 A1 Jan. 3, 2013

(30) Foreign Application Priority Data

Jun. 28, 2011 (JP) ................................ 2011-142807

(51) Int. Cl.
*G06K 9/46* (2006.01)
*G06K 9/66* (2006.01)
*G06T 5/00* (2006.01)

(52) U.S. Cl.
CPC ....... *G06T 5/002* (2013.01); *G06T 2207/10028* (2013.01); *G06T 2207/10004* (2013.01)
USPC ......................................................... 382/195

(58) Field of Classification Search
None
See application file for complete search history.

(56) References Cited

U.S. PATENT DOCUMENTS

| 5,085,502 A * | 2/1992 | Womack et al. ............... 356/605 |
| 6,201,899 B1 * | 3/2001 | Bergen ........................... 382/284 |
| 6,677,948 B1 * | 1/2004 | Wasserman et al. .......... 345/428 |
| 8,265,418 B2 * | 9/2012 | Gomi et al. .................... 382/274 |
| 8,405,742 B2 * | 3/2013 | Lim .......................... 348/240.99 |
| 8,406,548 B2 * | 3/2013 | Ali et al. ....................... 382/254 |
| 8,559,705 B2 * | 10/2013 | Ng ................................. 382/162 |
| 2007/0189750 A1 * | 8/2007 | Wong et al. ................... 396/121 |
| 2009/0073170 A1 * | 3/2009 | Berretty et al. ............... 345/427 |
| 2011/0032341 A1 * | 2/2011 | Ignatov et al. ................. 348/51 |
| 2012/0105590 A1 * | 5/2012 | Fukumoto et al. ............. 348/46 |
| 2013/0169845 A1 * | 7/2013 | Lim ............................... 348/239 |
| 2014/0013273 A1 * | 1/2014 | Ng ................................. 715/802 |

FOREIGN PATENT DOCUMENTS

JP 2003-37767 2/2003

* cited by examiner

*Primary Examiner* — Vikkram Bali
(74) *Attorney, Agent, or Firm* — Oblon, Spivak, McClelland, Maier & Neustadt, L.L.P.

(57) ABSTRACT

There is provided an image processing device including a focus area setting section, a depth acquisition section, and a blur processing section. The focus area setting section sets each of a plurality of areas as a focus area, and the each of the plurality of areas is intended to be kept in focus in a captured image of a subject. The depth acquisition section acquires a depth of the subject in relation to each pixel in the image. The blur processing section sets each of the pixels in the image as a target pixel and performs a blur process on the target pixel in accordance with a minimum value of absolute value of each depth difference between depth corresponding to the target pixel and depth corresponding to each of the focus area.

16 Claims, 25 Drawing Sheets

FIG.2
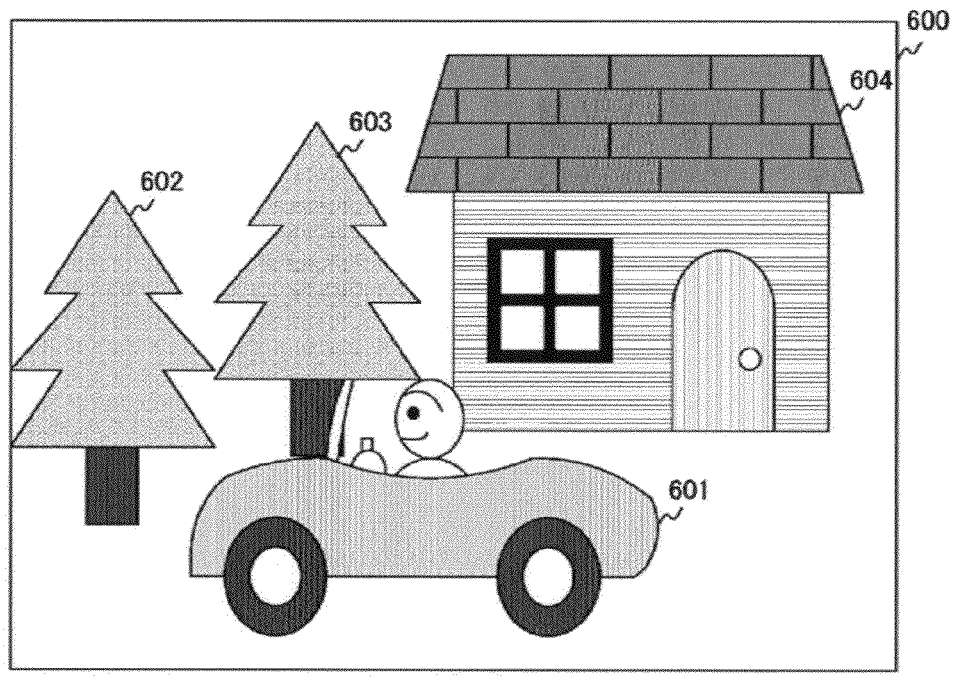
(a) IMAGE DATA
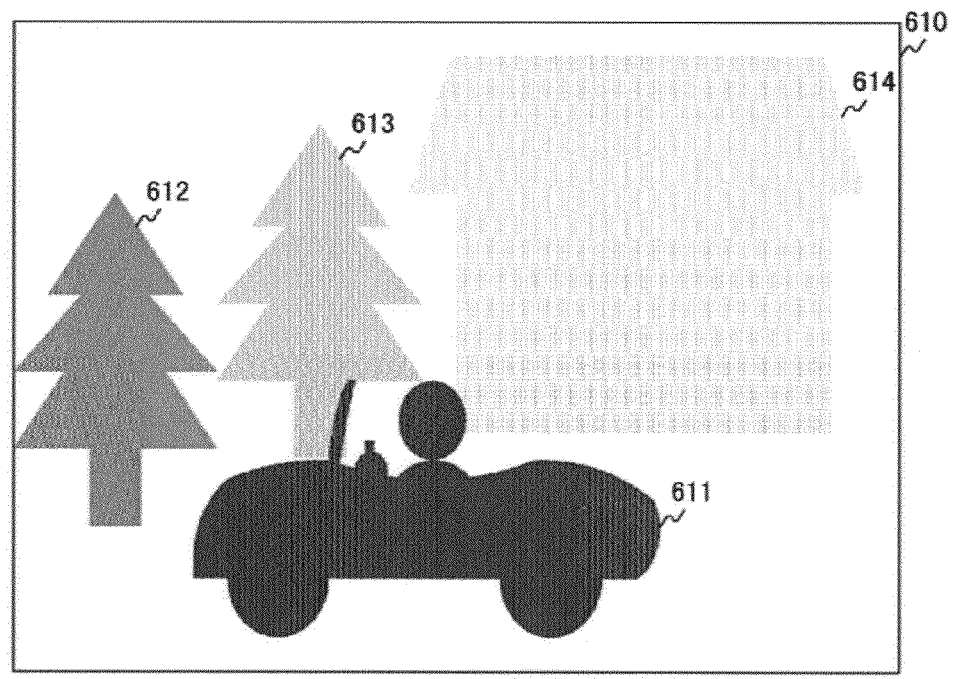
(b) DEPTH INFORMATION

FIG.4
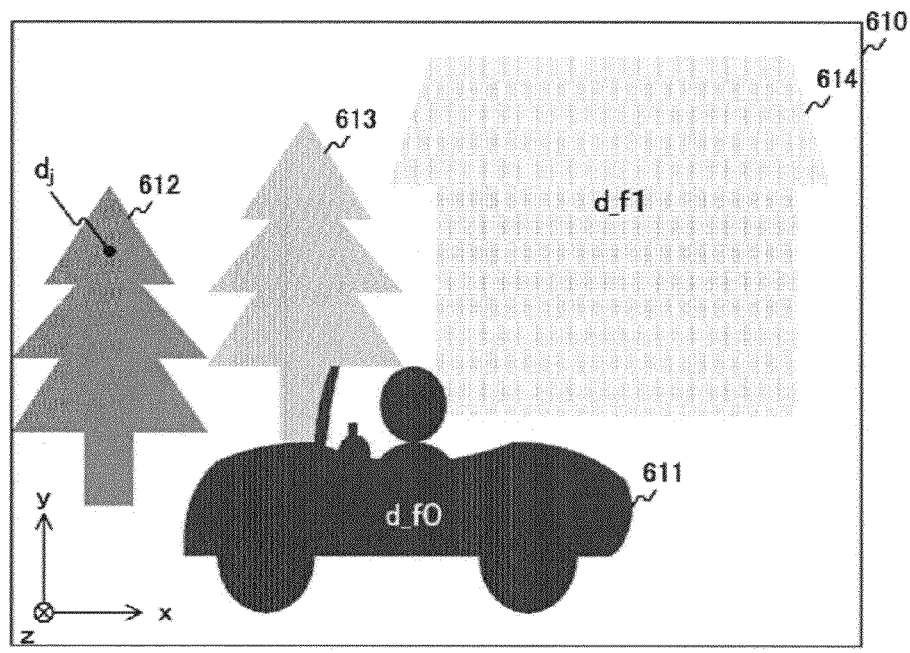
(a) DEPTH INFORMATION
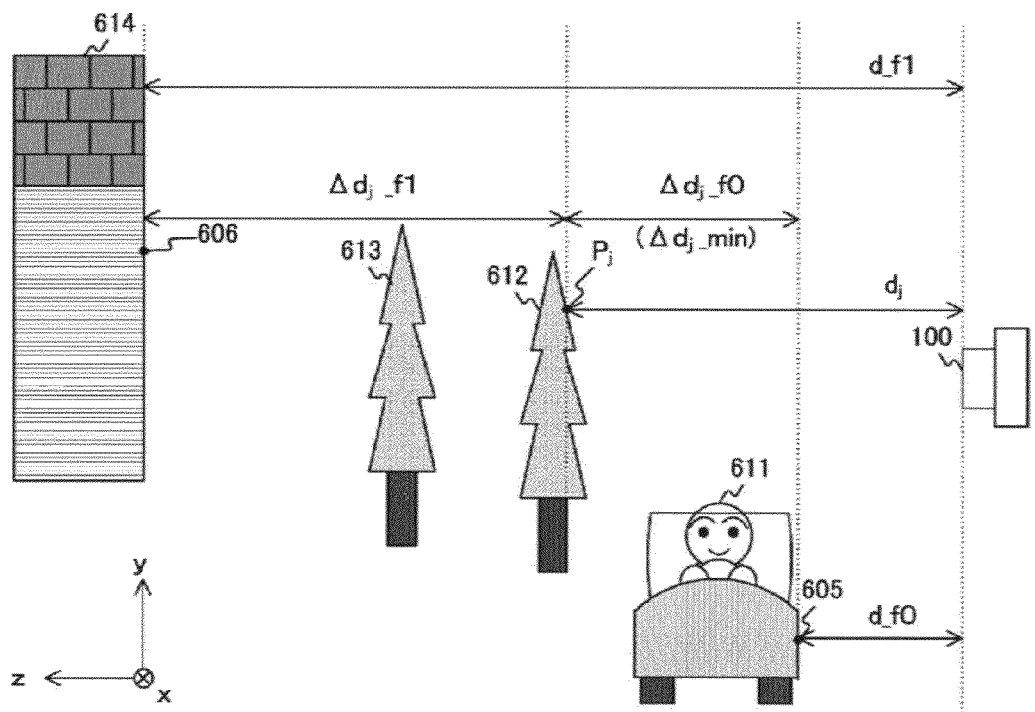
(b) DEPTH AND DEPTH DIFFERENCE ABSOLUTE VALUE

FIG.6

| PIXEL | DEPTH DIFFERENCE ABSOLUTE VALUE | | | |
|---|---|---|---|---|
| | FOCUS AREA f0 (DEPTH 10m) | FOCUS AREA f1 (DEPTH 30m) | FOCUS AREA f2 (DEPTH 20m) | ... |
| $P_2$ (0,0) (DEPTH 12m) | 2 (MINIMUM VALUE IN PIXEL $P_0$) | 18 | 8 | ... |
| $P_1$ (1,0) (DEPTH 12m) | 2 (MINIMUM VALUE IN PIXEL $P_1$) | 18 | 8 | ... |
| ⋮ | ⋮ | ⋮ | ⋮ | ⋮ |
| $P_{100}$ (100,0) (DEPTH 16m) | 6 | 14 | 4 (MINIMUM VALUE IN PIXEL $P_{100}$) | ... |
| ⋮ | ⋮ | ⋮ | ⋮ | ⋮ |
| $P_{200}$ (200,0) (DEPTH 36m) | 26 | 6 (MINIMUM VALUE IN PIXEL $P_{200}$) | 16 | ... |
| ⋮ | ⋮ | ⋮ | ⋮ | ⋮ |
| $P_{N-1}$ (W-1,H-1) (DEPTH 10.2m) | 0.2 (MINIMUM VALUE IN PIXEL $P_{N-1}$) | 19.8 | 9.8 | ... |

FIG.7

| PIXEL | DEPTH DIFFERENCE MINIMUM VALUE [m] | FILTER ORDER |
|---|---|---|
| $P_0(0, 0)$ | 2 | 4 |
| $P_1(1, 0)$ | 2 | 4 |
| ⋮ | ⋮ | ⋮ |
| $P_{100}(100, 0)$ | 4 | 8 |
| ⋮ | ⋮ | ⋮ |
| $P_{200}(200, 0)$ | 6 | 12 |
| ⋮ | ⋮ | ⋮ |
| $P_{N-1}(W-1, H-1)$ (DEPTH 10.2m) | 0.2 | 0.4 |

FIG.20
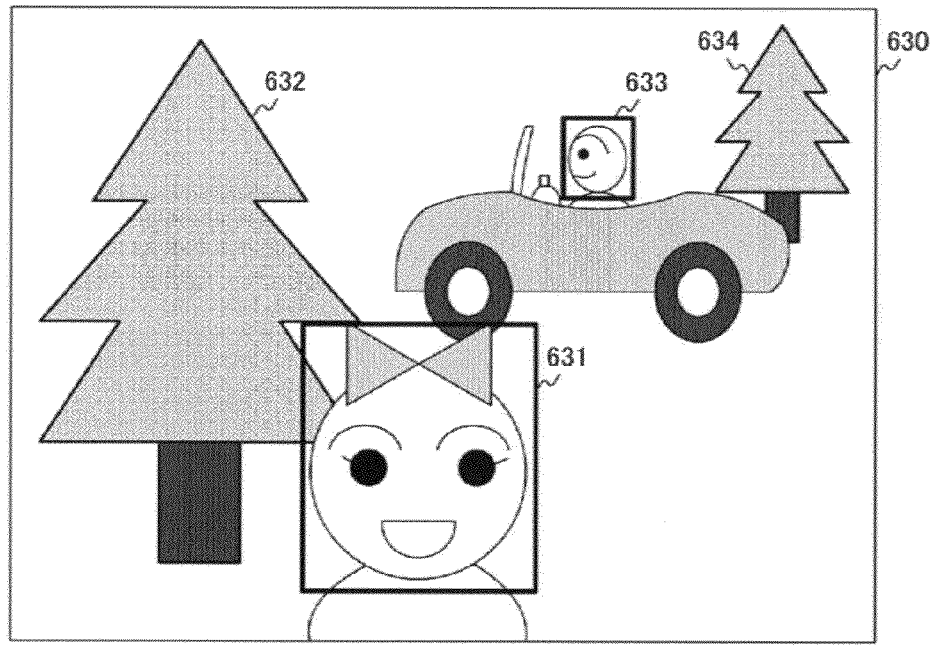
(a) IMAGE DATA BEFORE BLURRING
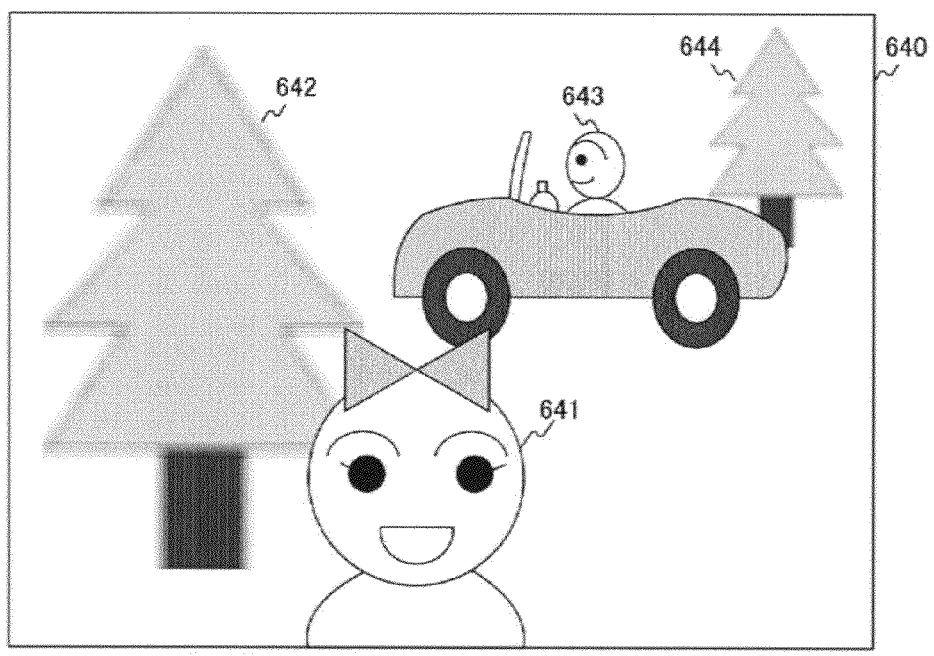
(b) IMAGE DATA AFTER BLURRING FIG.23
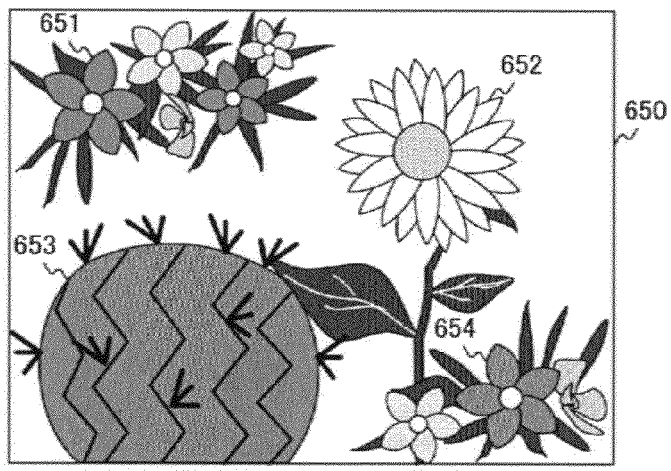
(a) IMAGE DATA BEFORE BLURRING
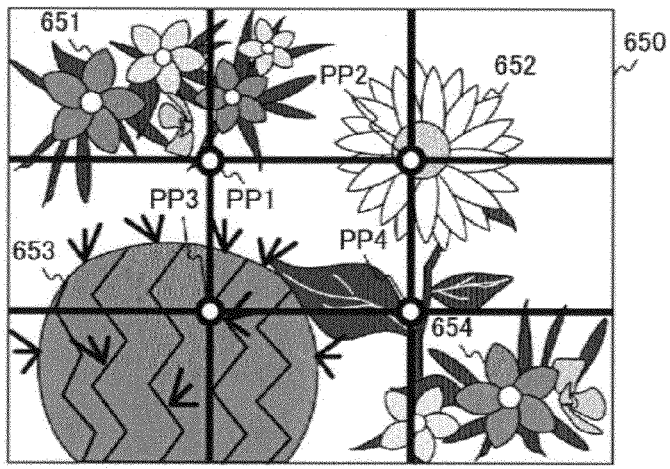
(b) IMAGE DATA IN WHICH THE RULE OF THIRDS COMPOSITION IS SET
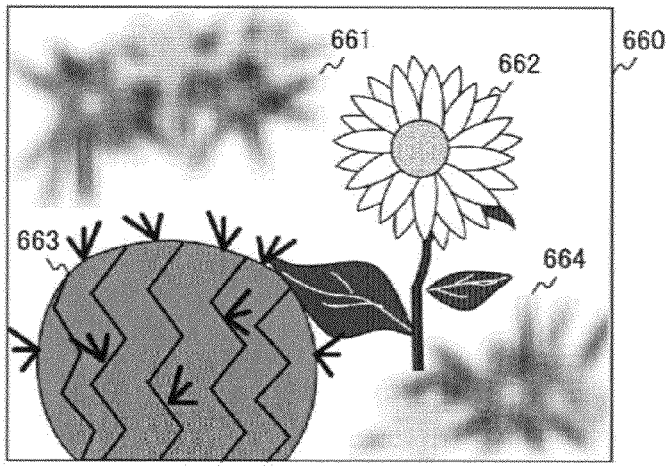
(c) IMAGE DATA AFTER BLURRING

FIG.24
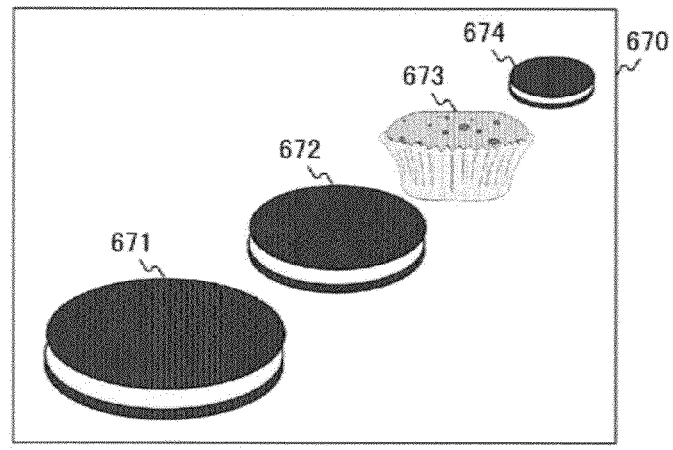
(a) IMAGE DATA BEFORE BLURRING
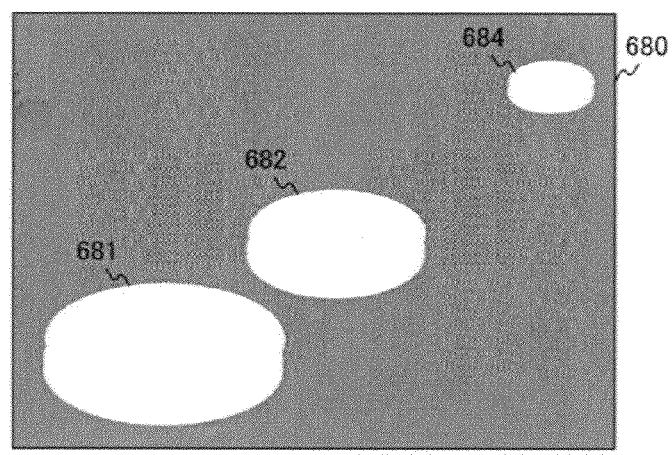
(b) FOCUS AREA INFORMATION
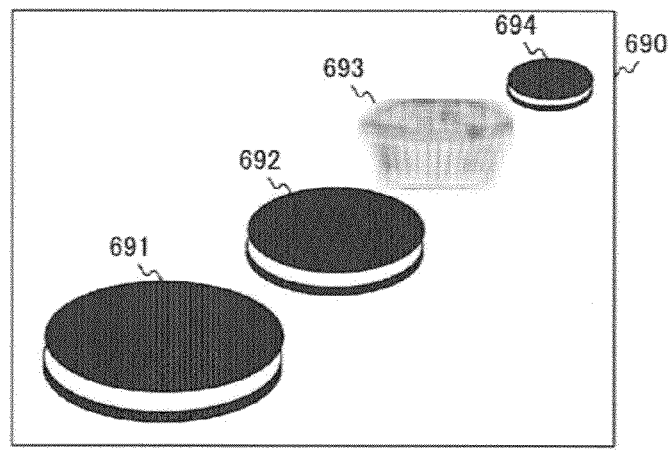
(c) IMAGE DATA AFTER BLURRING

IMAGE PROCESSING DEVICE, METHOD OF CONTROLLING IMAGE PROCESSING DEVICE, AND PROGRAM FOR ENABLING COMPUTER TO EXECUTE SAME METHOD

BACKGROUND

The present disclosure relates to an image processing device, a method of controlling the image processing device, and a program for enabling a computer to execute the method. More particularly, the present disclosure relates to an image processing device capable of performing a blur process, a method of controlling the image processing device, and a program for enabling a computer to execute the method.

In recent years, an image capturing apparatus which can measure a depth of a target to be captured has been commonly used. An example of a method for measuring the depth includes a depth from defocus (DFD) method, a stereo matching method, and so on. In the DFD method, the degree of blur for a subject in an image is analyzed, and the depth from image capturing apparatus to the subject is measured based on a relationship between the degree of blur and the depth. In the stereo matching method, a parallax is detected from a criterion image and a reference image, and the depth from the image capturing apparatus to the subject is measured based on a relationship between the parallax and the depth.

There has been proposed an image capturing apparatus which measures the depth from the image capturing apparatus to a subject using the above-mentioned methods and performs a blur process on a background of a main subject in accordance with the depth in a state that the main subject is kept in focus (see, for example, Japanese Patent Application Laid-open Publication No. 2003-37767). An image with enhanced perspective is generated by performing the blur process in accordance with the depth. This blur process is often used for clearly showing a person against a background in portrait photographs. In the image capturing apparatus equipped with image capturing elements having small light-receiving area, an image with a relatively less blurring is captured because of the characteristics of the image capturing elements, thus this blur process is commonly used to enhance the perspective of an image.

SUMMARY

However, in the above-described related art, when two or more areas are set to be kept in focus during the blur process (the areas are hereinafter referred to as "focus area"), it may be incapable of representing a natural perspective. As an example, it is assumed that two areas of close and far subjects are set as a focus area and the background is blurred. When the background is blurred in accordance with a distance from the close subject in the depth direction, a boundary between the un-blurred far subject and the blurred background becomes unnatural. On the other hand, when the background is blurred in accordance with a distance from the far subject, a boundary between the un-blurred close subject and the blurred background becomes unnatural. As a result, when setting a plurality of focus areas, there has been a problem that it may be not possible to represent a natural perspective.

The present disclosure has been made in view of the above situation. It is desirable to provide a technique for generating an image capable of representing a more natural perspective even when setting a plurality of focus areas.

According to an embodiment of the present disclosure, there is provided an image processing device, a method of controlling the image processing device, and a program for enabling a computer to execute the method. The image processing device includes a focus area setting section for setting each of a plurality of areas that are to be kept in focus in a captured image of a subject as a focus area, a depth acquisition section for acquiring a depth of the subject in relation to each pixel in the image, and a blur processing section for setting each pixel in the image as a target pixel and for performing a blur process on the target pixel in accordance with a minimum value of each depth difference absolute value between depth corresponding to the target pixel and depth corresponding to each of the focus area. According to this, it is possible to perform the blur process on the target image in accordance with a minimum value of each depth difference absolute value between depth corresponding to the target pixel and depth corresponding to each of a plurality of focus areas.

In the embodiment of the present disclosure, the focus area setting section may include a candidate area extraction part for extracting each of a plurality of areas to be a candidate for the focus area in the image as a candidate area, and a candidate area selection part for selecting a plurality of candidate areas among the extracted candidate areas and for setting each of the plurality of candidate areas as the focus area. Thus, each of the plurality of candidate areas which are selected among the extracted candidate areas can be set as the focus area.

In the embodiment of the present disclosure, the focus area setting section may recognize a captured area of a given object in the image and extract the area as the candidate area. Therefore, the captured area of the object can be extracted as the candidate area.

In the embodiment of the present disclosure, the candidate area extraction part may recognize a captured area of a face in the image and extract the area as the candidate area. As a result, the captured area of the face can be extracted as the candidate area.

In the embodiment of the present disclosure, the candidate area extraction part may include a composition decision portion for deciding a composition to define an arrangement of the subject in the image, and a candidate area extraction processing portion for extracting each of a plurality of areas as the candidate area based on the decided composition. Consequently, the candidate area can be extracted based on the decided composition.

In the embodiment of the present disclosure, the focus area setting section may further include a priority setting part for setting a priority for the selection of the candidate area to the extracted candidate area, and the candidate area selection part may select the candidate area based on the set priority. So, the candidate area can be selected based on the set priority.

In the embodiment of the present disclosure, the priority setting part may register a captured image of a given subject and set the priority to the candidate area based on a similarity between the registered image and the candidate area. Hence, the priority can be set based on the similarity between the registered image and the candidate area.

In the embodiment of the present disclosure, the priority setting part may set the priority based on an area size of the candidate area. According to this, the priority can be set based on the area size of the candidate area.

In the embodiment of the present disclosure, the priority setting part may set the priority based on the depth corresponding to any one pixel in the candidate area. Thus, the priority can be set based on the depth corresponding to any one pixel in the candidate area.

In the embodiment of the present disclosure, the priority setting part may set the priority of the candidate area to be higher as the depth corresponding to any one pixel in the candidate area is closer to a maximum or minimum value of the obtained depth. Therefore, the priority of the candidate area can be set to be higher as the depth of the candidate area is closer to a maximum or minimum value of the obtained depth.

In the embodiment of the present disclosure, the image may include criterion and reference images for using in the acquisition of the depth. The depth acquisition section may include a parallax detection part for detecting a distance between any one pixel in the criterion image and a pixel in the reference image corresponding to the pixel in the criterion image and for setting the distance as a parallax, and a depth generation part for generating the depth in relation to the pixel in the criterion image based on the detected parallax. The blur processing section may perform the blur process on each of the pixels in the criterion image as the target pixel. As a result, the depth can be generated based on the detected depth.

In the embodiment of the present disclosure, the blur processing section may perform the blur process on the target pixel, and the blur process may be calculated using the following expression:

$$\delta_j = D \times \Delta d_{j\_min} \times R / d_j$$

where $\delta_j$ is a degree of blur, D is an effective diameter of an image capturing apparatus by which the image is captured, $d_j$ is the depth corresponding to the target pixel, $\Delta d_{j\_min}$ is the minimum value, and R is an imaging magnification of the image. According to this, the degree of blur can be calculated from the above-mentioned expression.

In the embodiment of the present disclosure, the focus area setting section may set the focus area in accordance with an operation signal for specifying the focus area. Thus, the focus area can be set in accordance with the operation signal.

In the embodiment of the present disclosure, the focus area setting section may set the focus area by limiting the number of focus areas to be set to a value less than or equal to a threshold. Therefore, the number of focus areas to be set can be limited to a value less than or equal to a threshold.

According to the embodiments of the present disclosure described above, it is possible to generate an image capable of representing a more natural perspective when setting a plurality of focus areas.

BRIEF DESCRIPTION OF THE DRAWINGS

FIG. 2 is a diagram illustrating examples of image data and depth information according to the first embodiment;

FIG. 4 is a diagram illustrating examples of depth information, a measured depth, and a depth difference absolute value according to the first embodiment;

FIG. 6 is a diagram illustrating an example of a depth difference absolute value according to the first embodiment;

FIG. 7 is a diagram illustrating an example of a filter order according to the first embodiment;

FIG. 20 is a diagram illustrating examples of image data before and after blurring according to the fourth embodiment;

FIG. 23 illustrates examples of image data before and after blurring when the rule of thirds composition is set according to the fifth embodiment;

FIG. 24 illustrates examples of focus area information and image data before and after blurring when pattern composition is set according to the fifth embodiment.

DETAILED DESCRIPTION OF THE EMBODIMENT(S)

Figure 1:
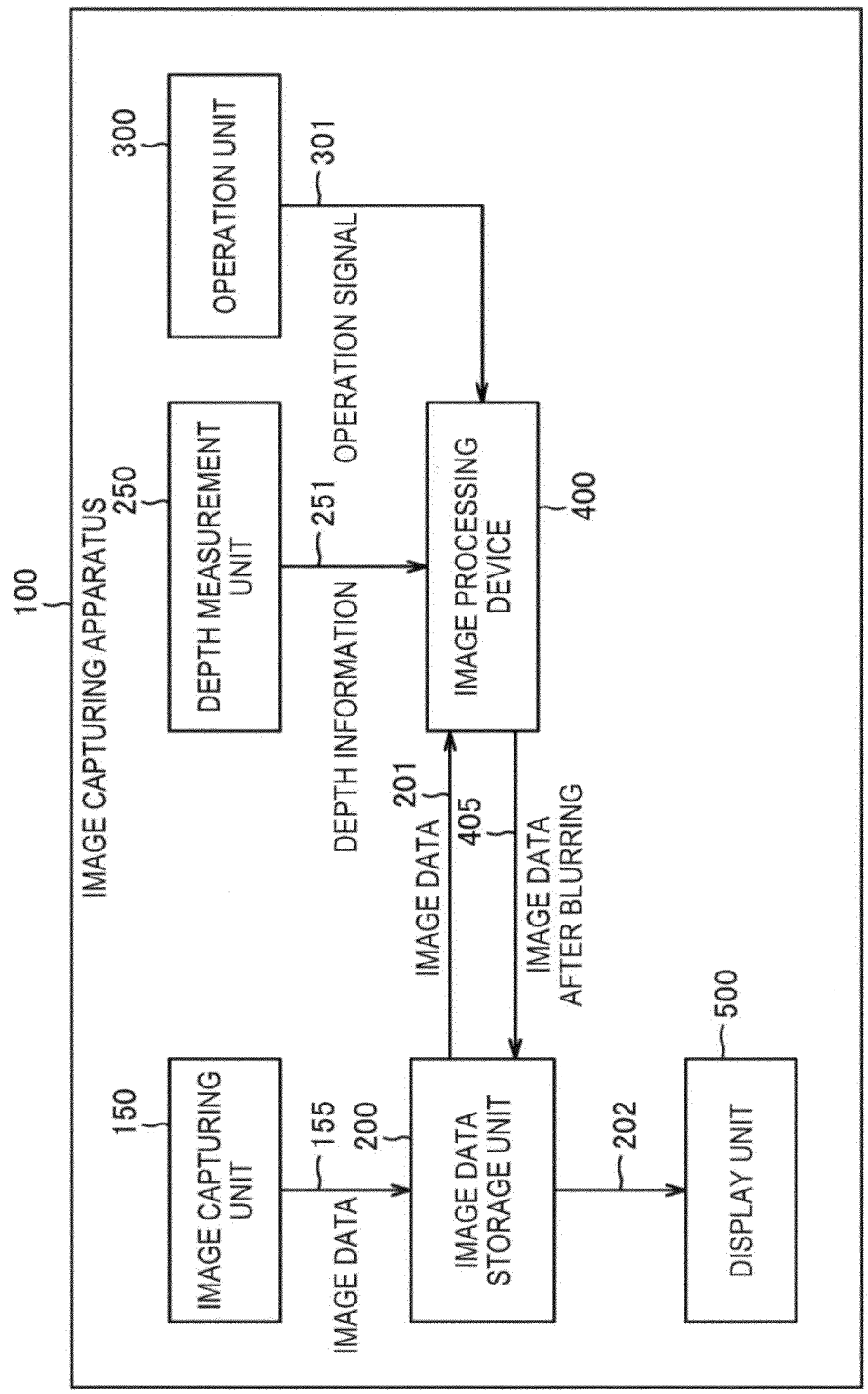
FIG. 1 is a block diagram illustrating a configuration example of an image capturing apparatus according to a first embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

An embodiment for implementing the present disclosure (hereinafter simply referred to as "embodiment") will be described below. In addition, the description will be made in the following order.

1. First Embodiment (image process: an example of setting a plurality of focus areas)
2. Second Embodiment (image process: an example of using the stereo matching)
3. Third Embodiment (image process: an example of performing an object recognition)
4. Fourth Embodiment (image process: an example of performing a facial recognition)
5. Fifth Embodiment (image process: an example of selecting a focus area based on the composition)

1. First Embodiment

[Configuration Example of Image Capturing Apparatus]

FIG. 1 is a block diagram illustrating a configuration example of an image capturing apparatus 100 according to a first embodiment of the present disclosure. The image capturing apparatus 100 captures a subject and performs a blur process on an image of the captured subject. The image capturing apparatus 100 includes an image capturing unit 150, an image data storage unit 200, a depth measurement unit 250, an operation unit 300, an image processing device 400, and a display unit 500.

The image capturing unit 150 captures a subject and generates image data. The image capturing unit 150 provides the image data storage unit 200 with the generated image data through a signal line 155.

The image data storage unit 200 stores the image data. More specifically, the image data storage unit 200 stores the image data which is generated by the image capturing unit 150 and the image processing device 400.

The depth measurement unit 250 measures the depth of a subject (a distance from the image capturing apparatus to the subject). For example, the depth measurement unit 250 analyzes a degree of blur of the subject in an image and measures the depth using the DFD method in which the depth of the subject is obtained, on the basis of a relationship between the degree of blur and the depth of the subject. The depth measurement unit 250 measures the depth in relation to each pixel in the image and generates depth information indicating the depth. The depth measurement unit 250 provides the image processing device 400 with the generated depth information through a signal line 251. The depth measurement unit 250 also can measure a depth using any measurement method other than the DFD method. For example, the depth measurement unit 250 can use a laser measurement method which irradiates a laser light onto a subject and measures a depth based on a delay time of the reflected light with respect to the irradiation time.

The operation unit 300 detects an operation signal for operating the image capturing apparatus 100. The operation signal includes an operation signal for setting a plurality of focus areas in an image. The operation unit 300 provides the image processing device 400 with the detected operation signal through a signal line 301.

The image processing device 400 generates the image data with enhanced perspective by performing a blur process on the image data. More specifically, the image processing device 400 sets a plurality of focus areas in an image in accordance with the operation signal. The image processing device 400 also acquires depth information generated by the depth measurement unit 250. In the image processing device 400, each pixel in an image is set as a target pixel $P_j$, and each depth difference absolute value between depth of the target pixel and depth of each of the plurality of focus areas is calculated as a depth difference absolute value $\Delta d_{j\_fm}$ for each target pixel. Here, j denotes a sequential number used for identifying each of the pixels in the image and is an integer from 0 to N−1. N is a value indicating the number of total pixels in the image and thus becomes a value obtained by multiplying the number of pixels in the vertical direction to the number of pixels in the horizontal direction. m is a sequential number used for identifying each of the focus areas and is an integer from 0 to M−1. M is the number of the set focus areas and is an integer greater than or equal to 2. Therefore, when M focus areas are set, M depth difference absolute values are calculated for each pixel in the image.

After M depth difference absolute values are calculated for each target pixel, the image processing device 400 selects a depth difference absolute value as a depth difference minimum value $\Delta d_{j\_min}$ for each target pixel. Thus, if the total number of pixels in the image is N, the total N depth difference minimum value are selected.

After the depth difference minimum value $\Delta d_{j\_min}$ is selected, the image processing device 400 calculates the degree of blur in accordance with the depth difference minimum value $\Delta d_{j\_min}$ for each target pixel.

The image processing device 400 performs the blur process on the image data in accordance with the calculated filter order. The image processing device 400 provides the image data storage unit 200 with the image data on which the blur process is performed, through a signal line 405.

The display unit 500 reads out image data from the image data storage unit 200 and displays the image data.

FIG. 2 is a diagram illustrating examples of image data and depth information according to the first embodiment. FIG. 2(a) illustrates an example of image data 600 which is inputted to the image processing device 400. In the image data 600, a subject 601 containing a car and a driver, subjects of trees 602 and 603, and a subject of house 604 are captured respectively.

FIG. 2(b) is a diagram illustrating an example of depth information 610 obtained in synchronization with the image data 600. The depth information 610 is data which indicates the depth of a subject corresponding to each pixel, and the depth is represented with a pixel value. For example, in the depth information 610, a luminance value is set by using a pixel value indicating the depth, and the luminance value is set to be lower as the depth is increased. The depth information 610 includes depth information of each of subjects 611, 612, 613 and 614 which respectively correspond to the subjects 601, 602, 603 and 604 in the image data 600. It is assumed that the subject 611 has the minimum depth among the subjects 611 to 614 and their respective backgrounds. Subsequently, it is assumed that depths of the remaining subjects and their respective backgrounds are increased in the order of the subject 612, the subject 613, the subject 614 and the backgrounds. In this case, in the depth information 610, the luminance value of the foremost subject 611 is set to be the lowest. The luminance values of the subjects and their respective backgrounds are set to be increased in the order of the subject 612, the subject 613, the subject 614 and the backgrounds in accordance with their respective depths. Alternatively, in the depth information 610, the luminance value may be set to be higher as the depth is decreased.

Figure 3:
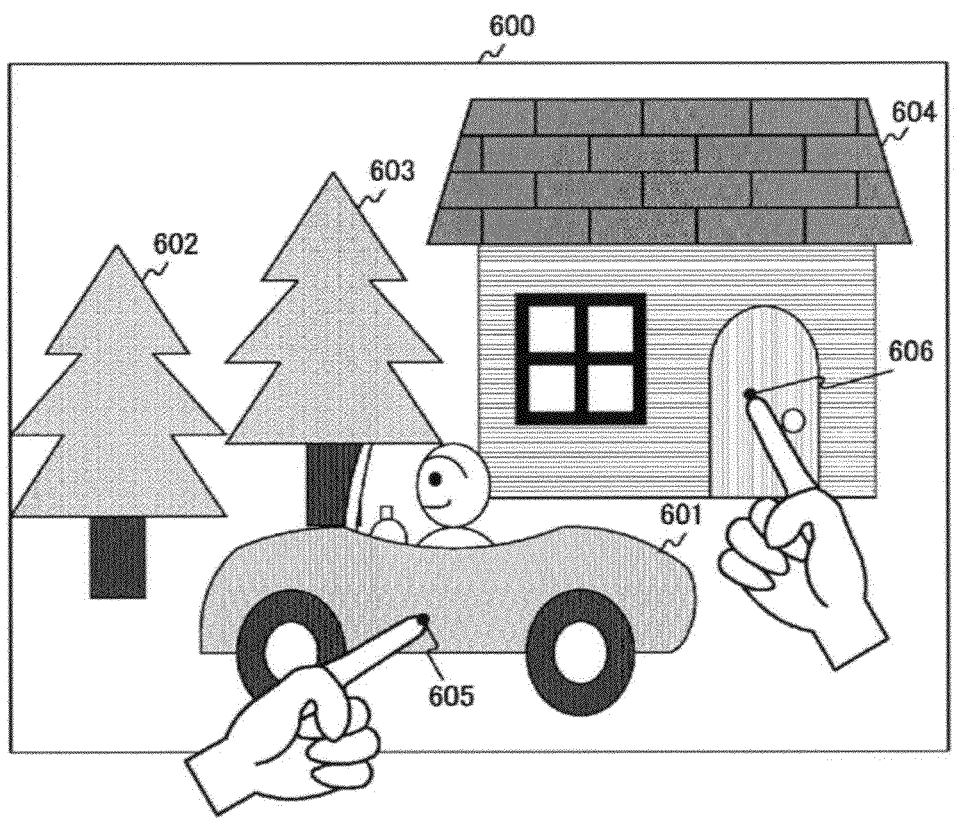
FIG. 3 is a diagram explaining a method for setting focus area according to the first embodiment.

FIG. 3 is a diagram explaining a method for setting a focus area according to the first embodiment. As an example, the image capturing apparatus 100 displays the image data 600 on a touch panel and receives user operations. When any one pixel of the image data 600 is designated by touching the pixel with user's finger, the image processing device 400 of the image capturing apparatus 100 detects a subject area containing the pixel. For example, the image processing device 400 detects the subject area containing the designated pixel by analyzing the distribution of luminance information in the image. The image processing device 400 may be configured to detect the subject area by analyzing the distribution of color information in addition to the distribution of the luminance information. The image processing device 400 sets the detected subject area as a focus area. The image capturing apparatus 100 may be configured to set the focus area by entering the coordinates of the pixel using numeric keys by a user instead of using the touch panel.

As an example, it is assumed that a pixel 605 in the subject 601 and a pixel 606 in the subject 604 are designated. In this case, the image processing device 400 detects the subjects 601 and 604 containing the designated pixels and sets each of the subjects as a focus area.

FIG. 4 is a diagram illustrating examples of depth information, a measured depth, and depth difference absolute value according to the first embodiment. When the focus area is set, the image processing device 400 designates each pixel in the image as a target pixel and calculates a depth difference absolute value by using a depth of the target pixel and each depth of the plurality of focus areas. For example, a depth difference absolute value of a target pixel $P_j$ in the subject 612 may be calculated. In this case, when the subjects 601 and 604 are each set as the focus area, the image processing device 400, as shown in FIG. 4(a), acquires a depth $d_j$ of the target pixel $P_j$ and the depths d_f0 and d_f1 which each correspond to any one pixel in the focus area. The image processing device 400 calculates the depth difference absolute values $\Delta d_j\_f0$ and $\Delta d_j\_f1$ from the following Expressions (1) and (2):

$$\Delta d_j\_f0 = |d_j - d\_f0| \quad (1)$$

$$\Delta d_j\_f1 = |d_j - d\_f1| \quad (2)$$

The image processing device 400 calculates the degree of blur $\delta_j$ for the target pixel $P_j$ from the depth difference absolute values obtained by Expressions (1) and (2).

FIG. 4(b) is a diagram illustrating an example of positional relationships in the depth direction of the subject in the image shown FIG. 4(a). More specifically, in a landscape shown in FIG. 4(a), in a case where x-axis is parallel to the horizontal direction, y axis is parallel to the vertical direction, and z-axis is parallel to the depth direction, FIG. 4(b) is the landscape seen from the direction of the x-axis. As shown in FIG. 4(b), when the focus area 10 is set to the subject 611, the distance on the z-axis from the image capturing apparatus 100 to the subject 611 becomes the depth d_f0. When the focus area f1 is set to the subject 614, the distance on the z-axis from the image capturing apparatus 100 to the subject 614 becomes the depth d_f1. When a pixel on the subject 612 is set to the target pixel $P_j$, the distance from the image capturing apparatus 100 to the subject 612 becomes the depth $d_j$. In this case, the depth difference absolute value $\Delta d_j\_f0$ is a distance from a side on the subject 611 facing the image capturing apparatus 100 to a side on the subject 612 facing the image capturing apparatus 100. The depth difference absolute value $\Delta d_j\_f1$ is a distance from a side on the subject 612 facing the image capturing apparatus 100 to a side on the subject 614 facing the image capturing apparatus 100.

When each side of the focus areas on the subjects 611 and 614 facing the image capturing apparatus 100 are not flat, it will actually cause some deviation in the depth of each pixel in the focus area. However, the degree of deviation is usually negligibly small, considering the measurement unit of the depth. For this reason, the image processing device 400 can acquire the depth corresponding to any pixel in the focus area (e.g., designated pixels 605 and 606) as the depth corresponding to the focus area.

[Configuration Example of Image Processing Device]

Figure 5:
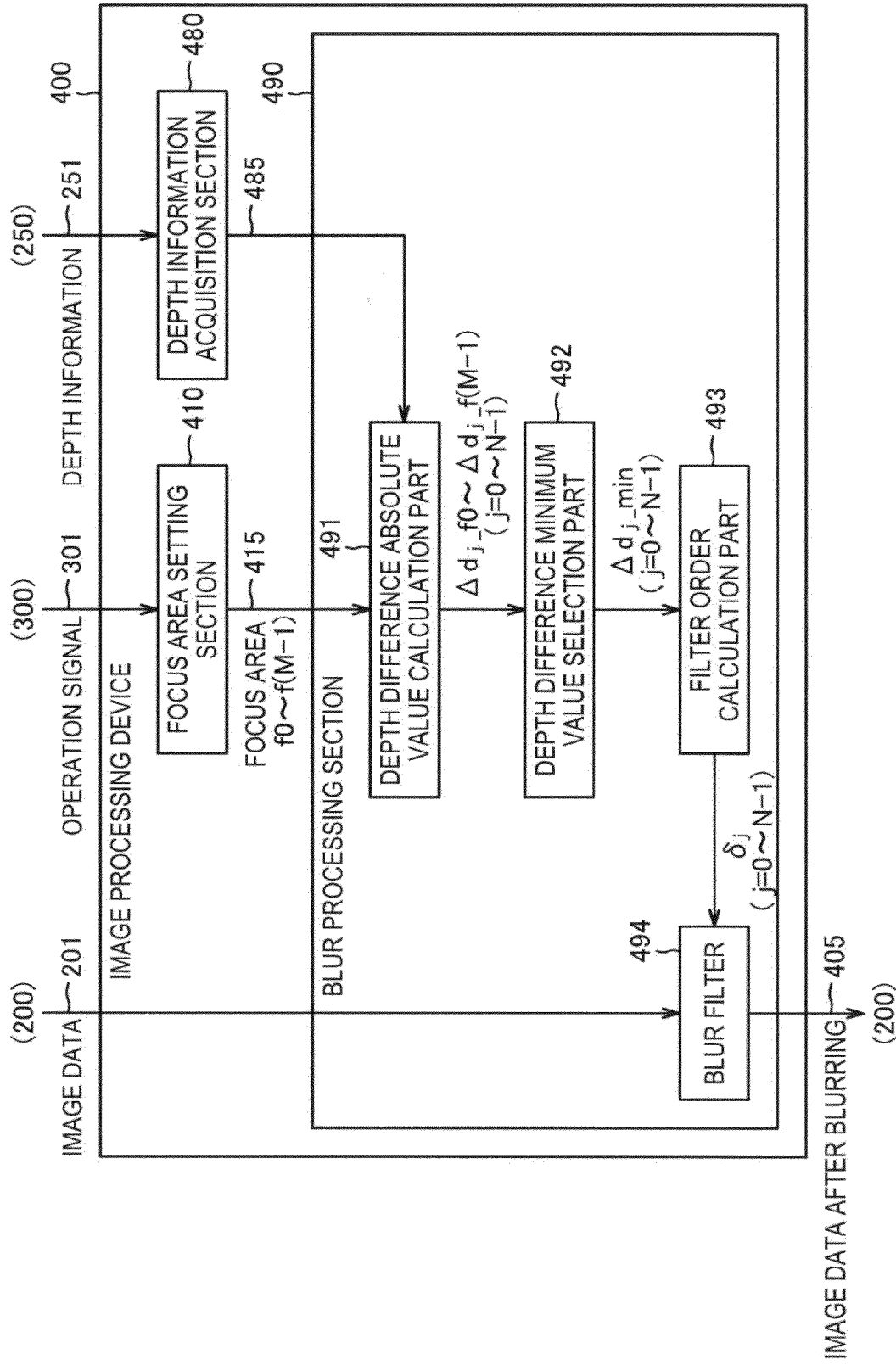
FIG. 5 is a block diagram illustrating a configuration example of an image processing device according to the first embodiment.

FIG. 5 is a block diagram illustrating a configuration example of the image processing device 400 according to the first embodiment. The image processing device 400 includes a focus area setting section 410, a depth information acquisition section 480, and a blur processing section 490.

The focus area setting section 410 is configured to set a plurality of focus areas 10 to f(M−1) in accordance with operation signals. The focus area setting section 410 provides the blur processing section 490 with focus area information indicating the set focus area through a signal line 415. The focus area information may include the coordinates of pixel group forming the contour of each focus area. The focus area information may include the coordinates of all pixels in the focus area. The focus area information may be image data in which each pixel value in the focus area is set to one (e.g., "1") of binary values and each pixel value in the region other than the focus area is set to the other (e.g., "0") of the binary values. Identification information for identifying each of the set focus areas is added to this image data. The identification information may include the coordinates of pixel in the image designated by a user and the sequential number (0 to M−1) corresponding to the coordinates.

The focus area setting section 410 detects the areas of the subject containing the designated pixel, and moreover the focus area setting section 410 may detect the subject by using other methods besides the above-mentioned method. For example, the focus area setting section 410 may detect a group of pixels having the depth in which the difference between the depth of the pixel in the group and the depth corresponding to the designated pixel is less than or equal to the predetermined value, with reference to the depth information. And then, in the focus area setting section 410, the detected group of pixels can be regarded as the subject area. The focus area setting section 410 also can detect the subject by performing edge detection and by extracting the contour of the subject containing the designated pixel.

The focus area setting section 410 sets the detected subject area as the focus area, and moreover the focus area setting section 410 may set an area in a figure (e.g., a circle) which has a given size and contains the designated pixel, as the focus area.

In the focus area setting section 410, the number of the focus areas may be limited to a value less than or equal to a threshold T (T is an integer greater than or equal to 2). In this case, when the number of the focus areas is equal to the threshold T, the focus area setting section 410 is configured not to accept operations for designating the subsequent focus areas.

The depth information acquisition section 480 acquires the depth information generated by the depth measurement unit 250. The depth information acquisition section 480 provides the blur processing section 490 with the acquired depth information through a signal line 485. The depth information acquisition section 480 is an example of the depth acquisition section recited in claims.

The blur processing section 490 performs the blur process on the image data. The blur processing section 490 includes a depth difference absolute value calculation part 491, a depth difference minimum value selection part 492, a filter order calculation part 493, and a blur filter 494.

The depth difference absolute value calculation part 491 calculates the depth difference absolute values $\Delta d_j\_f0$ to $\Delta d_j\_f(M-1)$ for each target pixel $P_j$ (j ranges from 0 to N−1) in the image based on focus area information and depth information. The depth difference absolute value calculation part 491 provides the depth difference minimum value selection part 492 with the calculated depth difference absolute value.

The depth difference minimum value selection part 492 selects the depth difference minimum value $\Delta d_j\_min$ for each target pixel in the image. The depth difference minimum value selection part 492 provides the filter order calculation part 493 with the selected depth difference minimum value.

The filter order calculation part 493 calculates the filter order $\delta_j$ for each target pixel $P_j$ in the image. The filter order calculation part 493 may calculate the degree of blur from the following Expression (3). However, in the following Expression (3), "$\delta_j$" denotes a degree of blur on the target pixel $P_j$, for example, a filter order of the blur filter. An amount of blurring is increased or decreased in accordance with the set filter order. "$\Delta d_j\_min$" denotes a depth difference minimum value of the target pixel $P_j$, and the unit thereof is, for example, [m]. "A" denotes a coefficient for converting a value of $\Delta d_j\_min$ into $\delta_j$.

$$\delta_j = A \cdot \Delta d_j\_min \quad (3)$$

The filter order calculation part 493 can calculate the degree of blur $\delta_j$ using the following Expression (4), instead of Expression (3). However, in the Expression (4), "D" denotes an effective aperture of lens in the image capturing apparatus 100, and the unit thereof is, for example, [mm]. "$d_j$" denotes depth of the target pixel $P_j$. "R" denotes an imaging magnification of the image data. "C" denotes coefficients for converting the amount of blurring obtained from D, $\Delta d_j\_min$, $d_j$, and R into the filter order $\delta_j$. The image processing device 400 calculates the filter order for all pixels in the image using Expression (3) or the following expression. When the following expression is used, the amount of blurring to be adapted to characteristics of actual optical systems is calculated. The filter order calculation part 493 provides the blur filter 494 with the calculated filter order $\delta_j$.

$$\delta_j = C \cdot D \cdot \frac{\Delta d_j\_min}{d_j} \cdot R \quad (4)$$

The blur filter 494 performs the blur process on the image data in accordance with the filter order $\delta_j$. As an example, the blur filter is a Gaussian filter which is a type of a smoothing filter, and calculates the pixel value I'(x,y) of the pixel after blurring (x,y) from the following expression. However, in the following Expression (5), "I(x+k,y+1)" denotes the pixel value of the pixel before blurring (x+k,y+1). "r" denotes a radius of the Gaussian filter and is an integer greater than or equal to 0. "w(k,l)" denotes a weighting coefficient to be multiplied by the pixel value I(x+k,y+1). In the following Expression (6), "σ" denotes the standard deviation, and a given real number is assigned as the standard deviation. Considering the following Expressions (5) and (6), the weighting coefficient is set to be higher as it is closer to the center of the Gaussian filter and it is set to be lower as it is closer to the peripheral of the Gaussian filter. In the following Expression (7), "round( )" denotes a function which performs a given rounding process for the numerical value in the parentheses and returns an integer value greater than 0. For example, the calculation which is rounded to the decimal point is executed as the rounding process.

$$I'(x, y) = \sum_{k=-r}^{r} \sum_{l=-r}^{r} w(k, l) I(x+k, y+l) \quad (5)$$

$$w(x, y) = \frac{1}{2\pi\sigma^2} \exp\left\{\frac{-(x^2+y^2)}{2\sigma^2}\right\} \quad (6)$$

$$r = \text{round}(\delta_j/2) \quad (7)$$

The blur processing section 490 calculates the filter order of the Gaussian filter as the degree of blur, and moreover the blur processing section 490 may calculate parameters other than the filter order as the degree of blur. For example, the blur processing section 490 can calculate the standard deviation δ as the degree of blur.

The blur processing section 490 performs the blur process using the Gaussian filter, and moreover the blur processing section 490 may use other blur filters such as a moving average filter.

Image processing device 400 is provided within the image capturing apparatus 100. Alternatively, the image processing device 400 may be provided outside of the image capturing apparatus 100, or the image processing device 400 and the image capturing apparatus 100 may be separate components.

FIG. 6 is a diagram illustrating an example of a depth difference absolute value according to the first embodiment. It may be considered that the plurality of focus areas including focus areas f0, f1 and f2 are set. It may be assumed that the respective depths corresponding to the focus areas f0, f1 and f2 are 10 m, 30 m and 20 m. If the depth corresponding to pixel $P_0(0,0)$ is 12 m, then the depth difference absolute value representing the depth difference between the depth of the pixel $P_0$ and the depth of the focus area f0 is 2 m. Also, the depth difference absolute values between the depth of the pixel $P_0$ and the depth of the focus area f1 and between the depth of the pixel $P_0$ and the depth of the focus area f2 are 18 m and 8 m, respectively. The lowest value of these depth difference absolute values is 2 m, and thus 2 m is selected as a depth difference minimum value in the pixel $P_0$.

In a similar manner, if the depth corresponding to the pixel $P_{100}(100,0)$ is 16 m, then 4 m is selected as the depth difference minimum value in the pixel. If the depth corresponding to the pixel $P_{200}(200,0)$ is 36 m, then 6 m is selected as the depth difference minimum value in the pixel. If the depth corresponding to the pixel $P_{N-1}(W-1,H-1)$ is 10.2 m, then 0.2 m is selected as the depth difference minimum value in the pixel. W denotes the total number of pixels in the horizontal direction in the image, and is an integer greater than or equal to 1. H denotes the total number of pixels in the vertical direction in the image, and is an integer greater than or equal to 1. Therefore, the depth difference absolute value is calculated for each of the set focus areas of pixels in the image. The smallest value of the depth difference absolute values is selected as the depth difference minimum value for each pixel.

FIG. 7 is diagram illustrating an example of a filter order according to the first embodiment. In the above-mentioned Expression (3), it is assumed that "2" is assigned to the coefficient A. In this case, if the depth difference minimum value of the pixel $P_0$ is 2 m, then "4" is calculated as the filter order by the Expression (3). In a similar manner, if the depth difference minimum values of the pixel $P_{100}$ and $P_{200}$ are 4 m and 6 m respectively, then "8" and "12" are each calculated as the filter order by the Expression (3). If the depth difference minimum value of the pixel $P_{N-1}$ is 0.2 m, then "0.4" is calculated as the filter order by the Expression (3).

Figure 8:
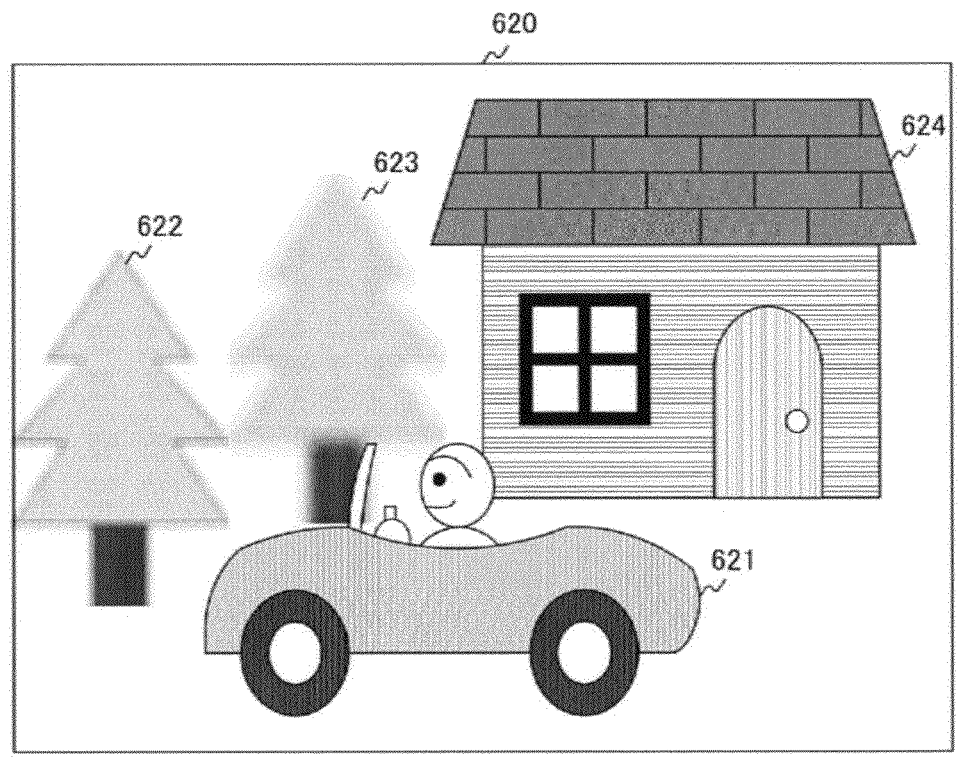
FIG. 8 is a diagram illustrating an example of an image data after blurring according to the first embodiment.

FIG. 8 is a diagram illustrating an example of image data before blurring 620 according to the first embodiment. The subjects 621 to 624 of the image data 620 correspond to the subjects 601 to 604 of the image data 600, respectively. Each of the subjects 621 to 624 is assumed to be set as a focus area. It is assumed that the subject 621 has a minimum depth among the subjects 621 to 624. Also, it is assumed that the depths of other subjects 622 to 624 are increased in the order of the subject 622, the subject 623, and the subject 624. Also, it is assumed that the subjects 622 and 623 are located closer to the subject 621 than the subject 624, and the subject 622 is located closer to the subject 621 than the subject 623.

In this case, the degree of blur is increased from a close focus area (e.g., subject 621) to a far focus area in the depth direction. The degree of blur becomes the largest at midpoint in the depth direction of the close focus area (subject 621) and the far focus area (subject 624). The degree of blur becomes decreased as it is closer to the far focus area (subject 624) beyond the midpoint depth. For example, since the subject 622 is located closer to the subject 621 than that of the subject 623 in the depth direction and the subject 622 is set as the focus area, the degree of blur on the subject 622 becomes smaller than the subject 623. Thus, even when a plurality of focus areas are set, the degree of blur is changed in accordance with the depth from the focus area located at the foremost point in the depth direction, thereby obtaining a more natural perspective.

[Operation Example of Image Processing Device]

Figure 9:
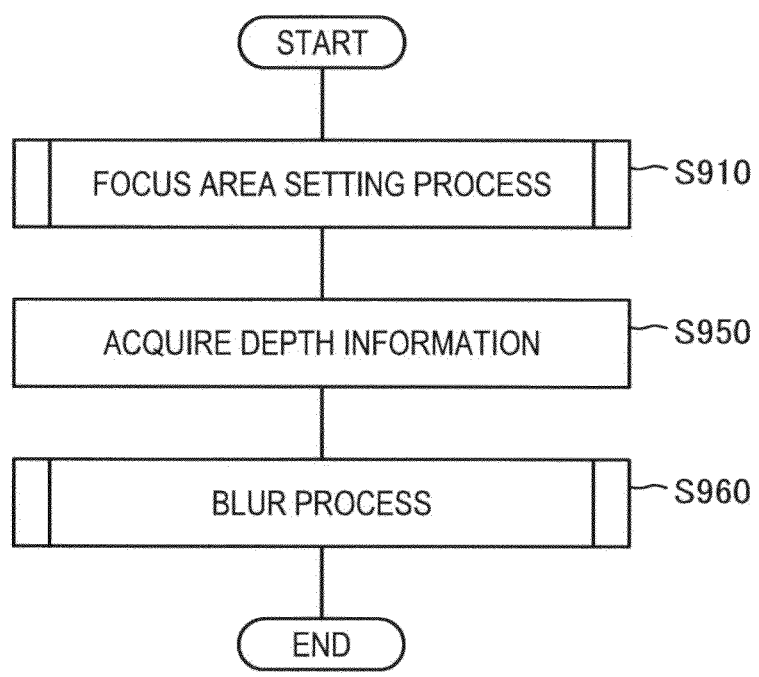
FIG. 9 is a flowchart illustrating an operation example of an image processing device according to the first embodiment.

The operation example of the image processing device 400 according to the first embodiment will be described with reference to FIG. 9 to FIG. 11. FIG. 9 is a flowchart illustrating an operation example of the image processing device 400 according to the first embodiment. This operation flow starts from entering the captured image data into the image processing device 400. The image processing device 400 performs a focus area setting process for setting a plurality of focus areas (step S910). The image processing device 400 acquires depth information from the depth measurement unit 250 (step S950). The image processing device 400 performs a blur process for blurring the image data (step S960). After performing step S960, the image processing device 400 terminates the operation for generating the image data after blurring.

Figure 10:
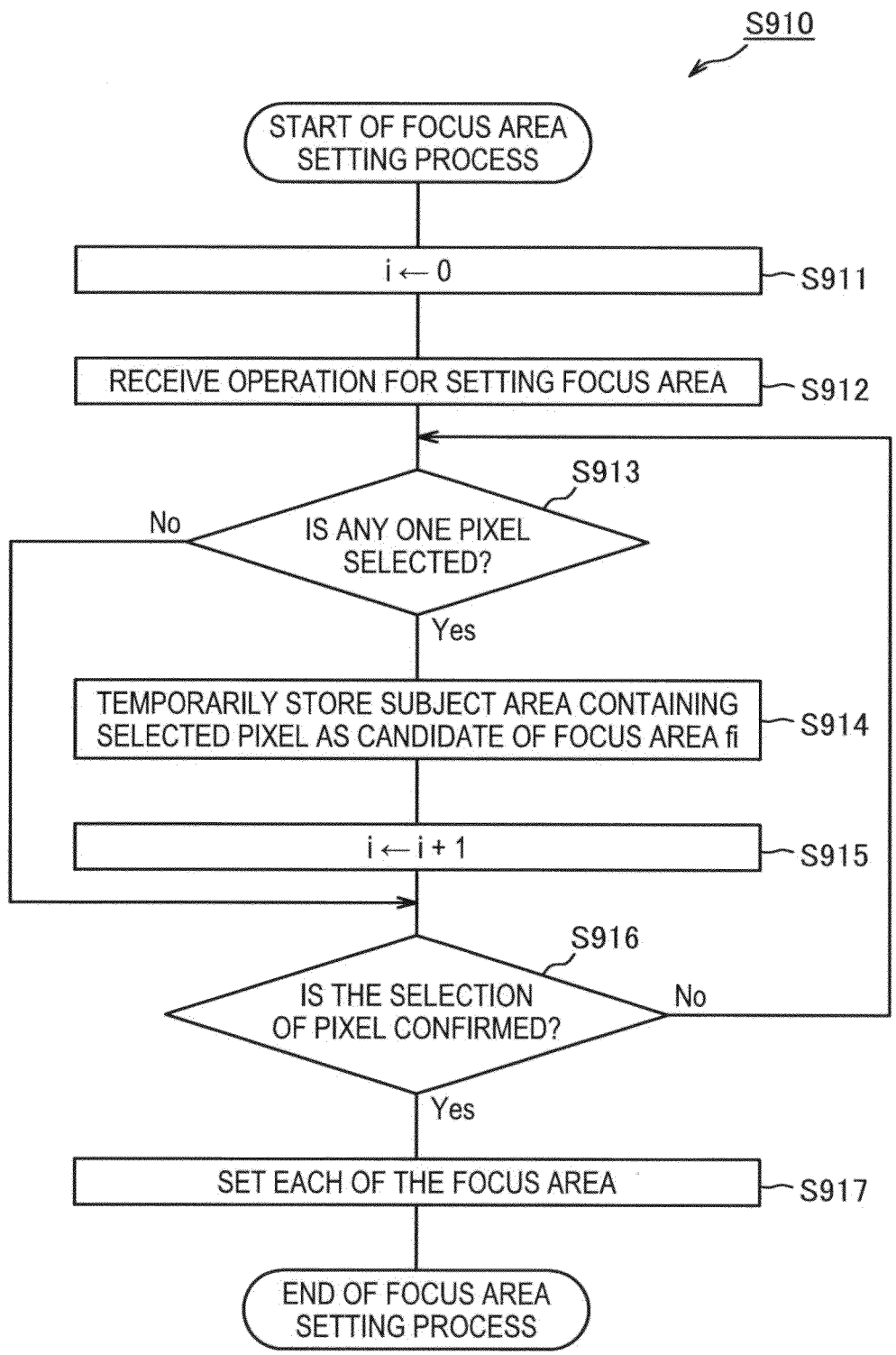
FIG. 10 is a flowchart illustrating a setting process of focus area according to the first embodiment.

FIG. 10 is a flowchart illustrating an example of a focus area setting process according to the first embodiment. The focus area setting section 410 initializes variable i to zero (0) (step S911) and receives an operation for setting a focus area (step S912). The focus area setting section 410 determines whether or not any one pixel is selected as a pixel in the focus area (step S913).

When the focus area setting section 410 determines that any one pixel is selected as a pixel in the focus area (step S913: Yes), the focus area setting section 410 temporarily stores the area containing the selected pixel as a candidate of focus area fi (step S914). The focus area setting section 410 increments the variable i by one (1) (step S915).

When determined that the pixel is not selected as a pixel in the focus area (step S913: No) or after performing step S915, the focus area setting section 410 determines whether or not the selection of the pixel is confirmed (step S916). When determined that the selection of the pixel is not confirmed (step S916: No), the focus area setting section 410 returns the process to step S913. When determined that the selection of the pixel is confirmed (step S916: Yes), the focus area setting section 410 sets each candidate as the focus area (step S917). After performing step S917, the focus area setting section 410 terminates the focus area setting process.

Figure 11:
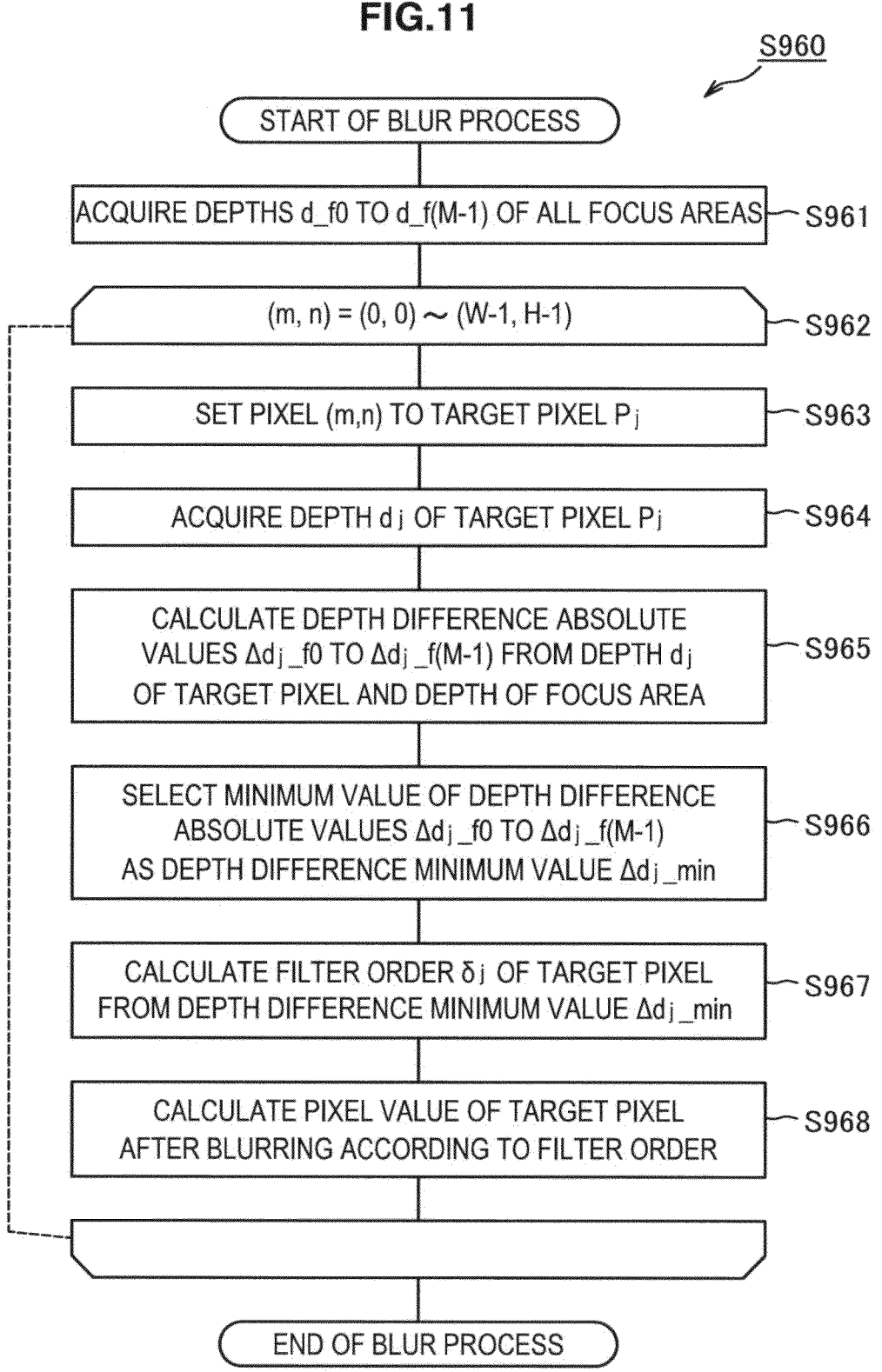
FIG. 11 is a flowchart illustrating an example of a blur process according to the first embodiment.

FIG. 11 is a flowchart illustrating an example of the blur process according to the first embodiment. The blur processing section 490 of the image processing device 400 acquires depths d_f0 to d_f(M−1) of all focus areas (step S961). The blur processing section 490 initializes variables m and n to zero (0), and starts a loop process. In this loop process, the blur processing section 490 performs steps S963 to S968 which will be described later, and increments the variables m and n by 1, respectively. When m>W−1 and n>H−1 after incrementing the respective variables, the loop process is terminated. And then, the process flow is returned to step S963, and the loop process continues (step S962).

The blur processing section 490 sets pixel (m,n) to target pixel $P_j$ (step S963). The blur processing section 490 acquires depth $d_j$ of the target pixel $P_j$ (step S964). The blur processing section 490 also calculates depth difference absolute values $\Delta d_j\_f0$ to $\Delta d_j\_f(M-1)$ from the depth $d_j$ of the target pixel $P_j$ and the depths d_f0 to d_f(M−1) of the focus area (step S965). The blur processing section 490 selects the minimum value of the calculated depth difference absolute values $\Delta d_j\_f0$ to $\Delta d_j\_f(M-1)$ as a depth difference minimum value $\Delta d_j\_min$ (step S966). The blur processing section 490 calculates filter order 6, of the target pixel $P_j$ from the selected depth difference minimum value $\Delta d_j\_min$ using the above-mentioned Expression (3) (step S967). The blur processing section 490 calculates the pixel value of the target pixel after blurring $P_j$ using the above-mentioned Expressions (5) and (6) in accordance with the calculated filter order (step S968).

After the loop process is completed (step S962), the blur processing section 490 terminates the blur process.

As such, according to the first embodiment, the focus area setting section 410 sets a plurality of focus areas. The depth information acquisition section 480 acquires depths in relation to pixels. The blur processing section 490 calculates each of the depth difference absolute values between depth of pixels and depth corresponding to each of the focus areas as a depth difference absolute value for each pixel in the image. The blur processing section 490 selects the smallest value of the depth difference absolute values as the depth difference minimum value for each pixel. The blur processing section 490 calculates the filter order from the depth difference minimum value and performs the blur process in accordance with the calculated filter order. Therefore, the degree of blur on a subject is changed in accordance with the depth from the focus area located closest to the subject in the depth direction. As a result, an image capable of representing a more natural perspective can be generated even when setting a plurality of focus areas.

2. Second Embodiment

[Configuration Example of Image Capturing Apparatus]

Figure 12:
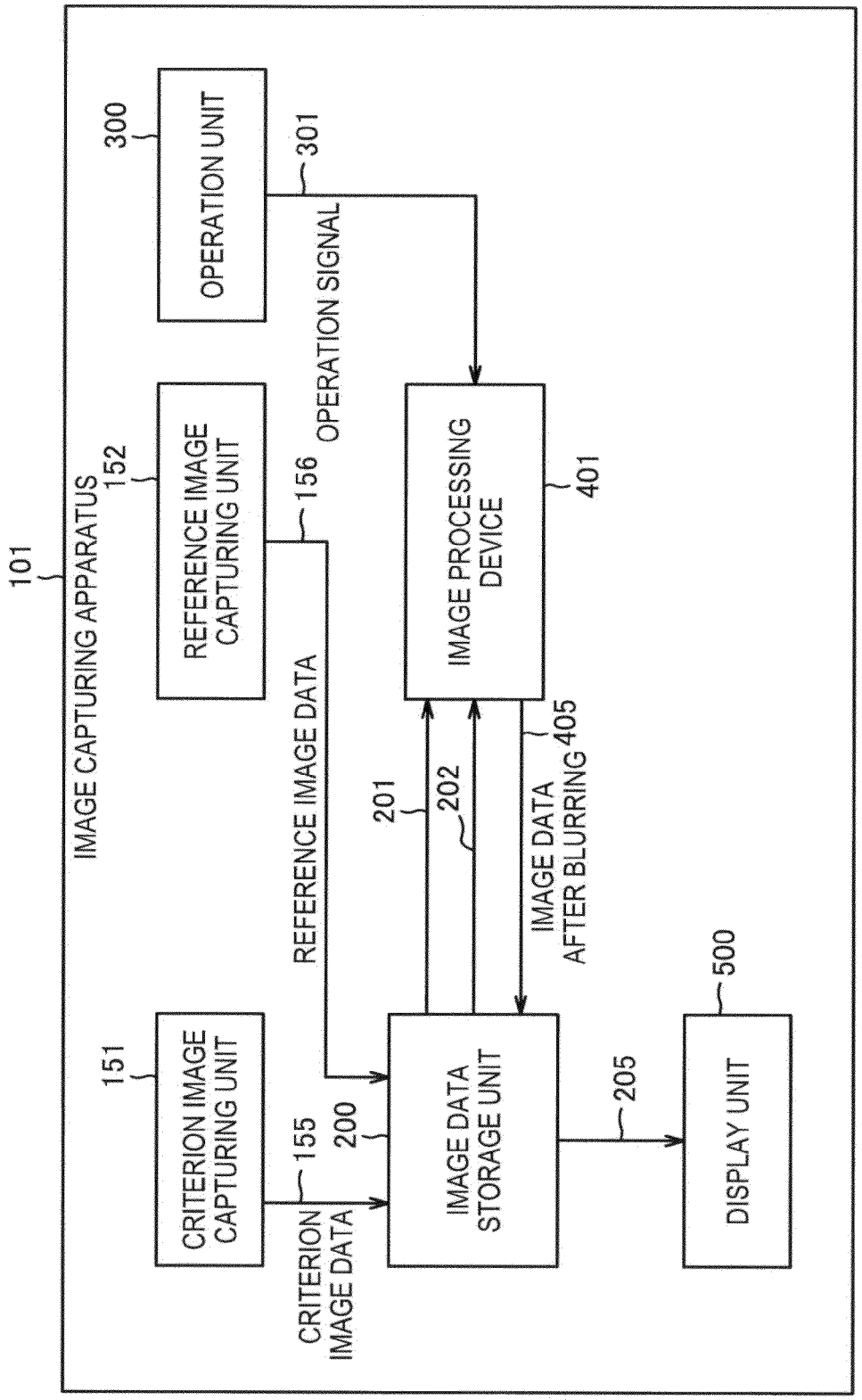
FIG. 12 is a block diagram illustrating a configuration example of an image capturing apparatus according to a second embodiment.

A second embodiment of the present disclosure will be described with reference to FIG. 12 to FIG. 16. FIG. 12 is a block diagram illustrating a configuration example of an image capturing apparatus 101 according to a second embodiment. The image capturing apparatus 101 is different from the image capturing apparatus 100 of the first embodiment in that the image capturing apparatus 101 generates depth information by the stereo matching method. The stereo matching method will be described in detail later. The image capturing apparatus 101 includes a criterion image capturing unit 151 and a reference image capturing unit 152, instead of the image capturing unit 150. The image capturing apparatus 101 also includes an image processing device 401 instead of the image processing device 400. The image capturing apparatus 101 is different from the image capturing apparatus 100 in that the image capturing apparatus 101 may not include the depth measurement unit 150.

The criterion image capturing unit 151 captures a criterion image. The criterion image is an image to be a criterion in calculating the depth. For example, any one of images including a right image captured by the right lens of the image capturing apparatus 101 and a left image captured by the left lens of the image capturing apparatus 101 may be the criterion image. The criterion image capturing unit 151 provides the image data storage unit 200 with criterion image data through the signal line 155. The criterion image data indicates the captured criterion image.

The reference image capturing unit 152 captures a reference image. The reference image is an image which is captured in synchronization with the criterion image and which is referenced in calculating the depth. For example, image other than the reference image of the left and right images may be the reference image. The reference image capturing unit 152 provides the image data storage unit 200 with reference image data through the signal line 156. The reference image data indicates the captured reference image.

The image processing device 401 reads out the criterion image data and the reference image data from the image data storage unit 200. The image processing device 401 calculates the depth from the criterion and reference image data in relation to the pixel using the stereo matching method. The image processing device 401 performs the blur process on the criterion image based on the calculated depth.

[Configuration Example of Image Processing Device]

Figure 13:
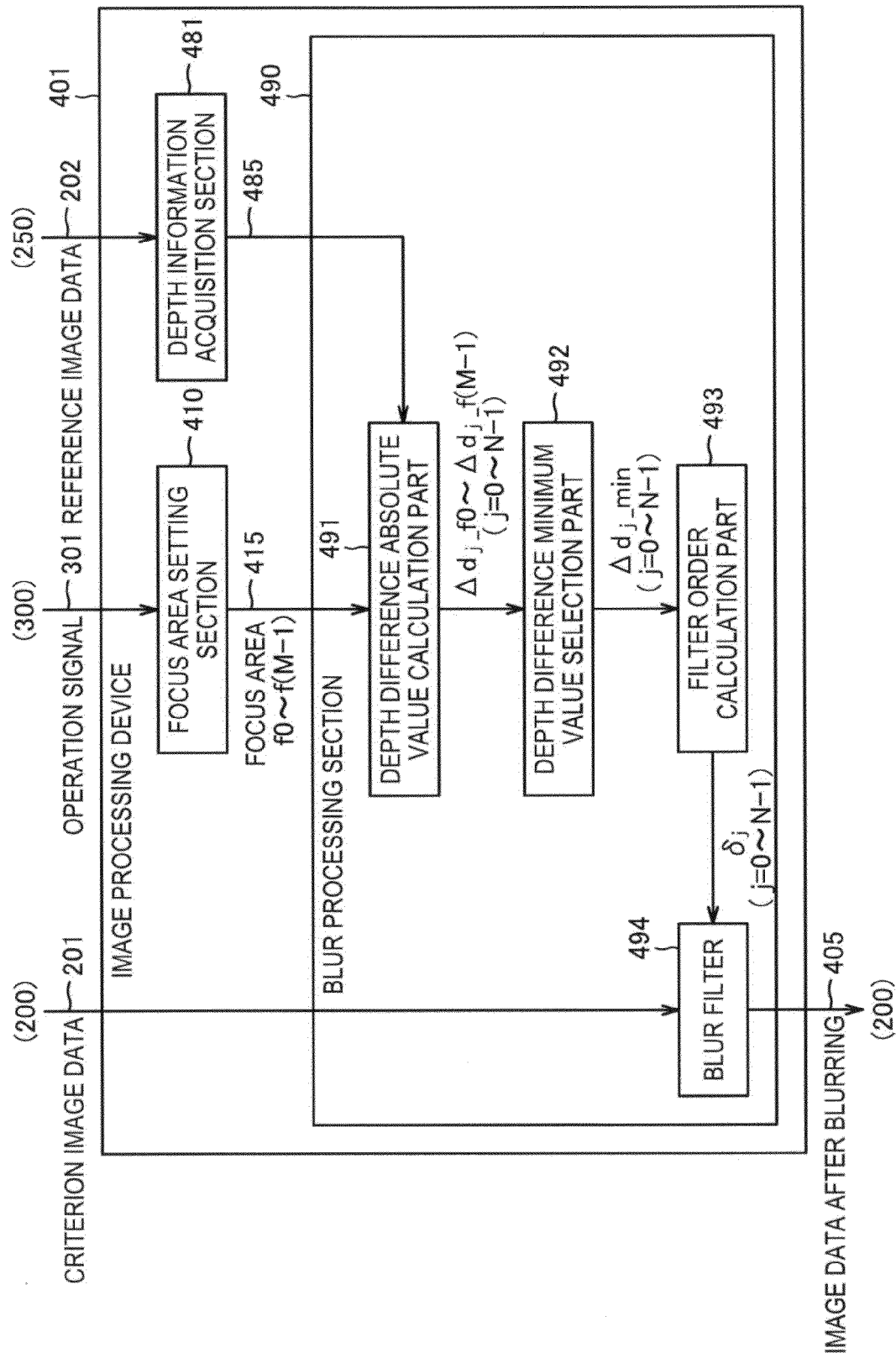
FIG. 13 is a block diagram illustrating a configuration example of an image processing device according to the second embodiment.

A configuration example of the image processing device according to the second embodiment will be described with reference to FIG. 13. FIG. 13 is a block diagram illustrating an exemplary configuration of the image processing device 401 according to the second embodiment. The image processing device 401 is different from the image processing device 400 of the first embodiment in that the image processing device 401 includes a depth information acquisition section 481 instead of the depth information acquisition section 480.

Figure 14:
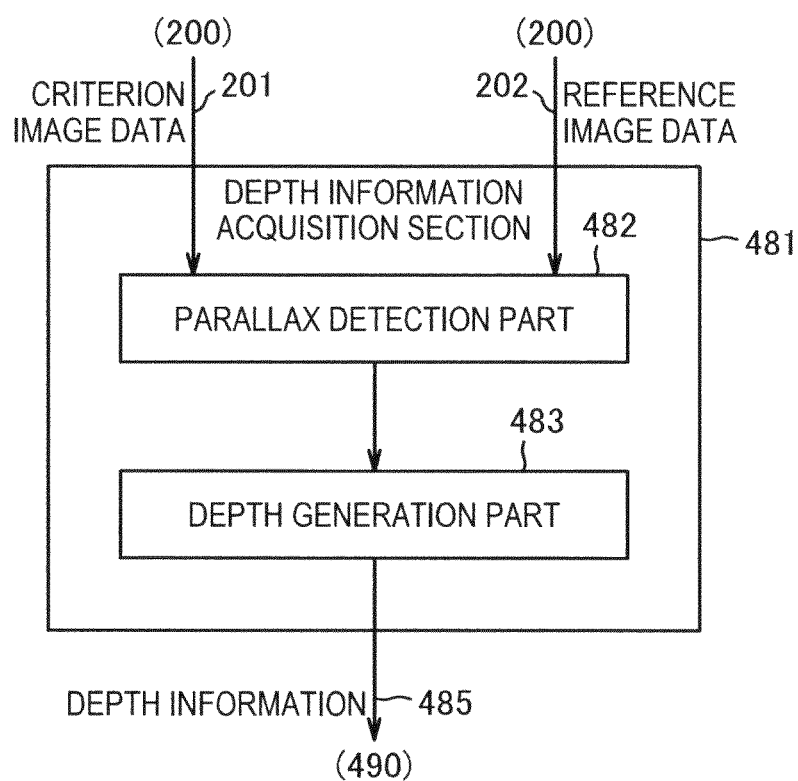
FIG. 14 is a block diagram illustrating a configuration example of a depth information acquisition section according to the second embodiment.

FIG. 14 is a block diagram illustrating a configuration example of the depth information acquisition section 481 according to the second embodiment. The depth information acquisition section 481 includes a parallax detection part 482 and a depth generation part 483.

The parallax detection part 482 detects a parallax from the criterion and reference images. More specifically, the parallax detection part 482 reads out the criterion and reference image data from the image data storage unit 200. The parallax detection part 482 sets any one pixel in the criterion image as a target point, and obtains a correspondence point corresponding to a target point in the reference image. The parallax detection part 482 detects an absolute value of difference between horizontal coordinate of the target point and horizontal coordinate of the correspondence point as a parallax. The parallax detection part 482 provides the depth generation part 483 with the parallax for all pixels in the criterion image.

The depth generation part 483 generates depth information from the parallax. A method for generating the depth information from the parallax will be described later. The depth generation part 483 obtains the depth in relation to each pixel in the image and generates the depth information. The depth generation part 483 provides the blur processing section 490 with the depth information.

Figure 15:
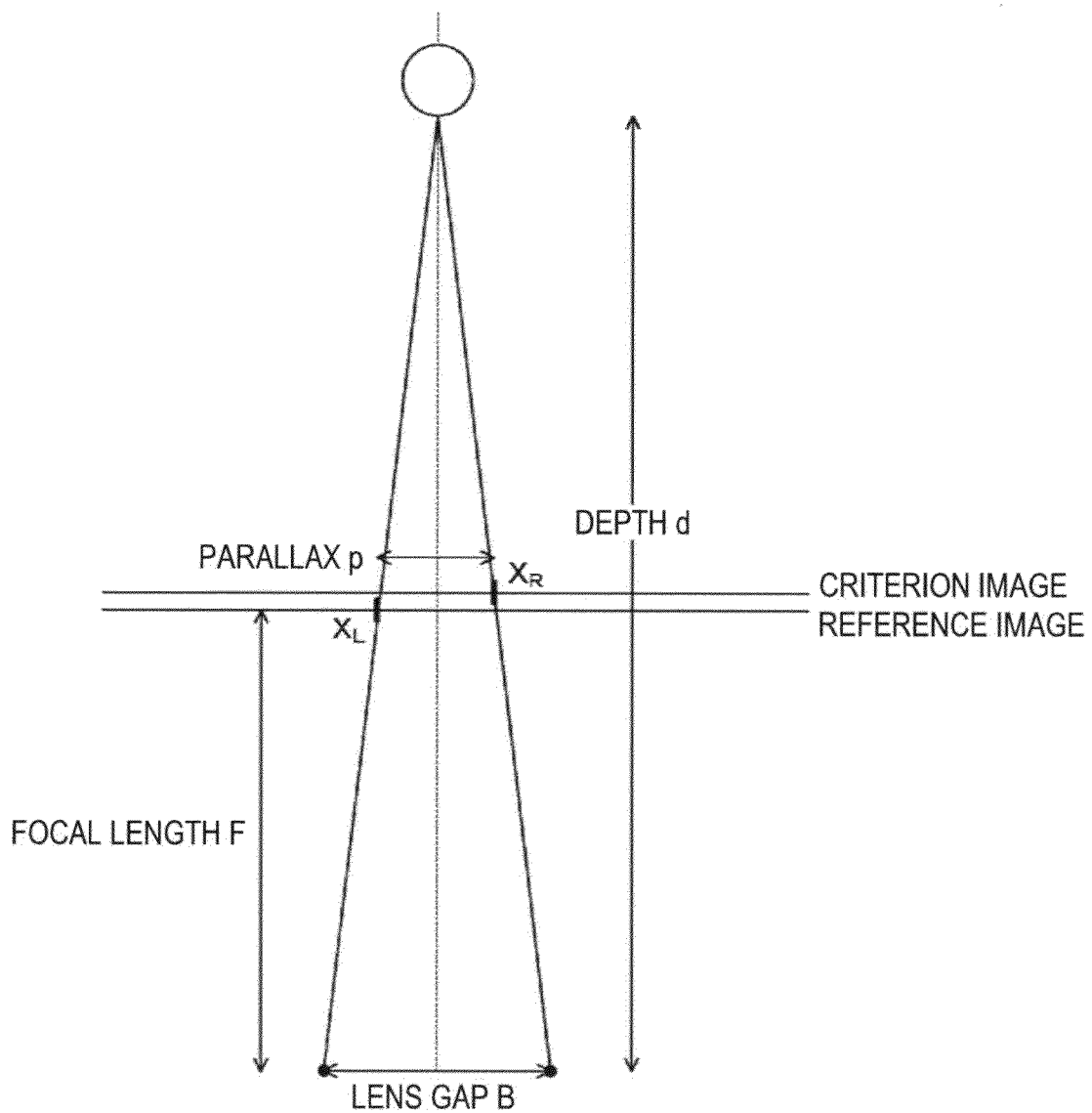
FIG. 15 is a diagram illustration a relationship between a parallax and a depth according to the second embodiment.

FIG. 15 is a diagram illustrating an example of a relationship between parallax and depth according to the second embodiment. If the horizontal coordinate of the target point in the criterion image is $X_R$ and the horizontal coordinate of the correspondence point in the reference image is $X_L$, the parallax p is calculated by the following expression:

$$p=|X_R-X_L| \quad (8)$$

If a gap between lenses of the criterion image capturing unit 151 and the reference image capturing unit 152 is B and focal length is F, then the triangle formed by the target point ($X_R$), the correspondence point ($X_L$) and a subject is similar to the triangle formed by the lens of the criterion image capturing unit 151, the lens of the reference image capturing unit 152, and the subject. As a result, when the depth of the subject is d, a relational expression which may be indicated as the following expression is established:

$$p:F=B:d \quad (9)$$

By rearranging Equation (9), the following expression can be obtained:

$$d=B\times F/p \quad (10)$$

B and F are known values. By substituting the detected parallax p into Expression (10), the depth d is calculated.

[Operation Example of Image Processing Device]

Figure 16:
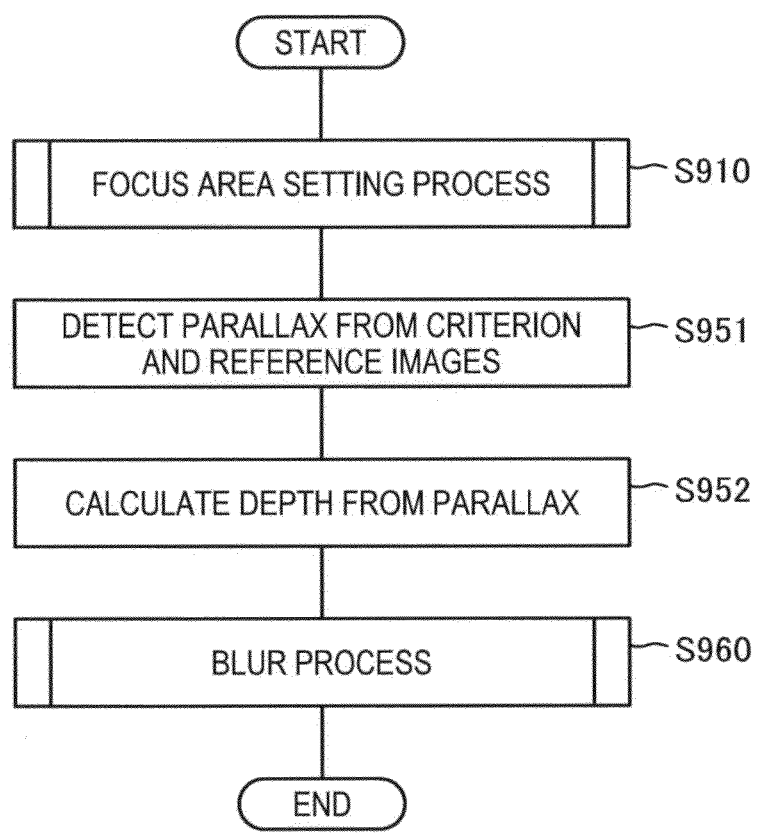
FIG. 16 is a flowchart illustrating an operation example of the image processing device according to the second embodiment.

An operation example of the image processing device 401 according to the second embodiment will be described with reference to FIG. 16. FIG. 16 is a flowchart illustrating an operation example of the image processing device 401 according to the second embodiment. The operation of the image processing device 401 is different from the image processing device 400 of the second embodiment in that the image processing device 401 performs steps S951 and S952 instead of step S950.

The image processing device 401 detects parallax p from the criterion and reference images (step S951). The image processing device 401 calculates the depth d from the parallax p based on Expression (10) and generates depth information (step S952).

Therefore, according to the second embodiment of the present disclosure, the focus area setting section 410 sets the focus area, and the depth information acquisition section 481 detects the parallax from the criterion and reference images and generates the depth information based on the parallax. The blur processing section 490 selects the depth difference minimum value for each pixel based on the depth information and calculates the filter order from the depth difference minimum value, thereby performing the blur process. Thus, the image processing device 401 can independently generate the depth information.

3. Third Embodiment

[Configuration Example of Image Processing Device]

Figure 17:
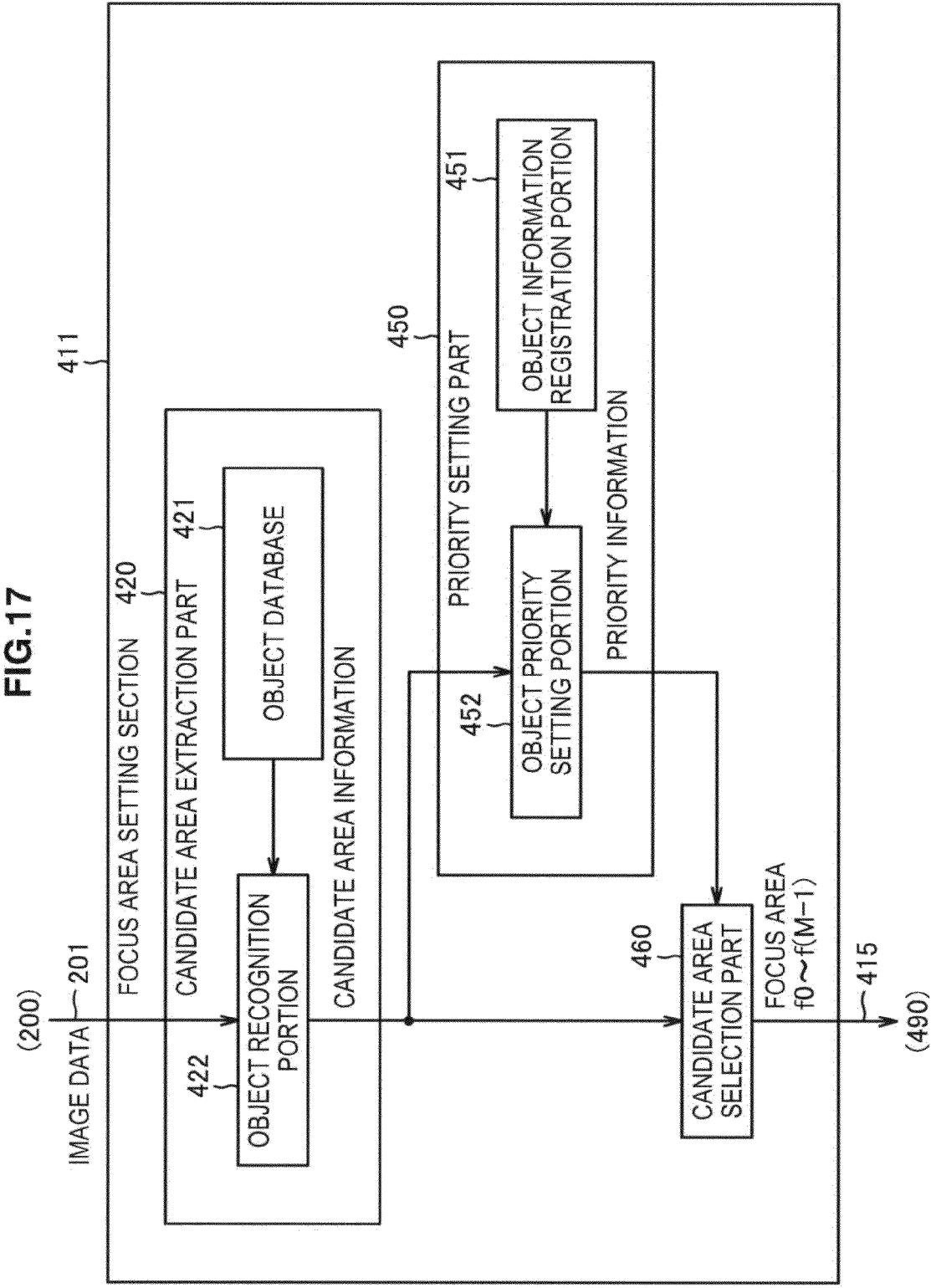
FIG. 17 is a block diagram illustrating a configuration example of a focus area setting section according to a third embodiment.
Figure 18:
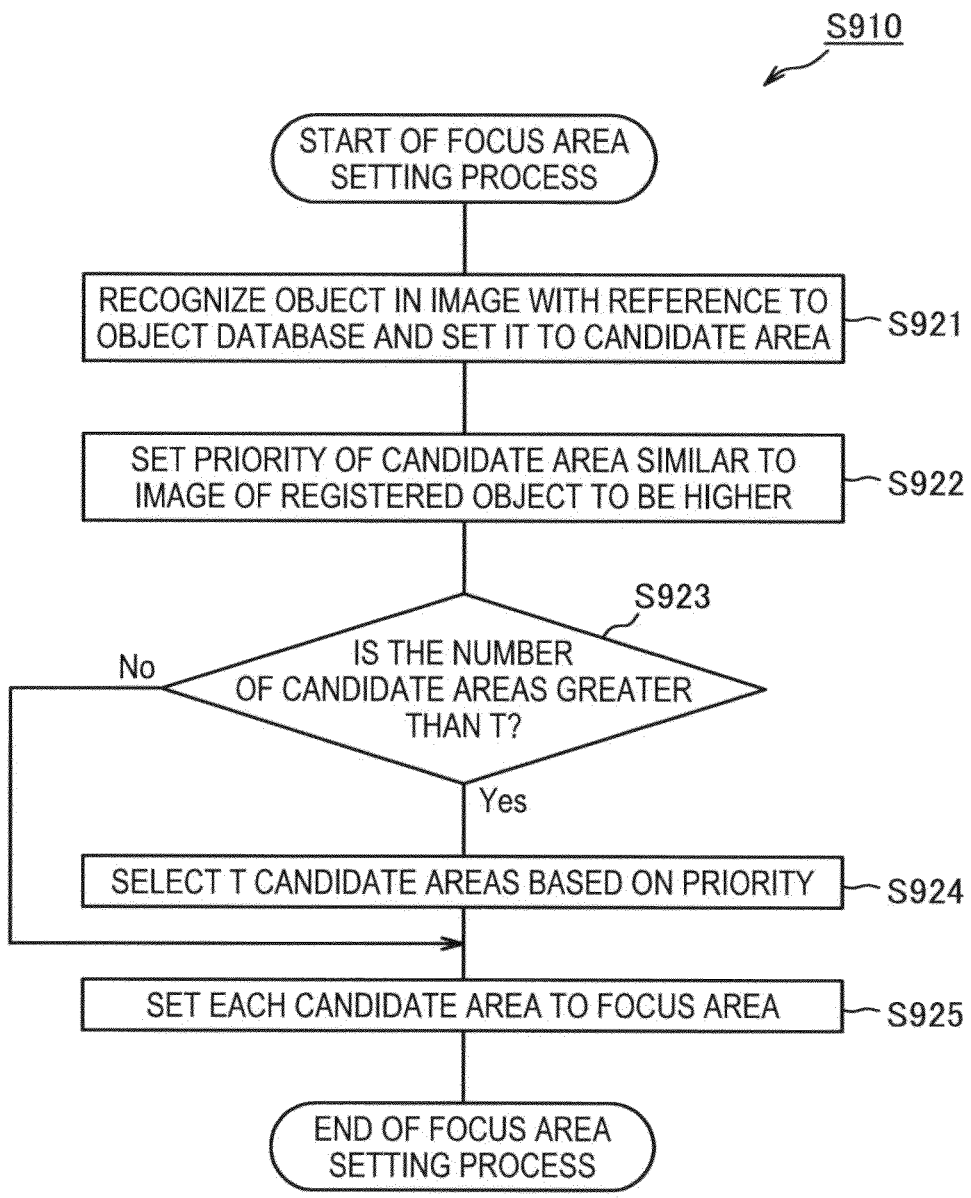
FIG. 18 is a flowchart illustrating an example of a focus area setting process according to the third embodiment.

A third embodiment of the present disclosure will be described with reference to FIG. 17 and FIG. 18. FIG. 17 is a block diagram illustrating a configuration example of a focus area setting section 411 according to the third embodiment. The focus area setting section 411 is different from the focus area setting section 410 of the first embodiment in that the focus area setting section 411 recognizes a plurality of objects in an image and sets each of the objects as a focus area. The focus area setting section 411 includes a candidate area extraction part 420, a priority setting part 450, and a candidate area selection part 460.

The candidate area extraction part 420 extracts each of the plurality of areas to be a candidate of focus area as a candidate area in an image. The candidate area extraction part 420 includes an object database 421 and an object recognition portion 422.

The object database 421 is a database for storing information which is used for recognizing an object to be recognized. For example, the object database 421 stores various information such as image data learned about the object to be recognized, a category of the object, and feature amount of the object.

The object recognition portion 422 refers to the object database 421 and recognizes a plurality of objects in an image. The object recognition portion 422 sets each area of the recognized objects to a candidate area which may be a candidate of the focus area. The object recognition portion 422 generates candidate area information indicating the candidate area in the image and provides the candidate area information to the priority setting part 450 and the candidate area selection part 460.

The priority setting part 450 sets the priority for selecting the candidate area to each candidate area. The priority setting part 450 includes an object information registration portion 451 and an object priority setting portion 452.

The object information registration portion 451 registers object information associated with the object whose priority for selection is to be changed. More specifically, the object information may include image data of object, name of object, and so on.

The object priority setting portion 452 sets the priority for each of the candidate areas. For example, the object priority setting portion 452 sets the priority of the candidate area which is similar to an image of the registered object to be higher than that of the candidate area which is not similar to the image of the registered object. Alternatively, the object priority setting portion 452 may be configured to set the priority of the candidate area which is not similar to the image of the registered object to be higher.

The object priority setting portion 452 may be configured to set the priority based on the area size of the candidate area. More specifically, the object priority setting portion 452 sets the priority to be higher as the area size of the candidate area becomes larger. The object priority setting portion 452 may calculate an average value for the entire area size of the candidate area and set the priority to be higher as the area size of the candidate area approaches to the average value.

The object priority setting portion 452 may set the priority based on the depth corresponding to the candidate area. In this case, the object priority setting portion 452 may set the priority to be higher as the depth is increased. Alternatively, the object priority setting portion 452 may set the priority to be higher as the depth is decreased. The object priority setting portion 452 may obtain a maximum value or a minimum value of the depth corresponding to the entire pixels in the image and set the priority of the object to be higher as the depth of the object approaches the maximum value or the minimum value. In this way, when a higher priority is assigned to the objects located closer and farther away in a depth direction, it makes easier to set the focus area to objects located far away from each other in the depth direction. As a result, the blurring becomes more and more apparent as the object deepens. The vicinity of the midpoint of a close object and a far object is most blurred. The blurring becomes less and less apparent as the object deepens in the depth direction beyond the midpoint. This enables the degree of blur to be noticeable and the perspective in an image is more enhanced.

The object priority setting portion 452 provides the candidate area selection part 460 with priority information indicating the set priority.

The candidate area selection part 460 selects a plurality of candidate areas of the candidate areas indicated by the candidate area information and sets each of the plurality of candidate areas as a focus area. However, the candidate area selection part 460 limits the number of the focus areas to be set to a value less than or equal to T (T is an integer greater than or equal to 2). More specifically, when the number of the candidate areas is limited to a value less than or equal to T, the candidate area selection part 460 sets all of the candidate areas as the focus area. If the number of the candidate areas is larger than T, then the candidate area selection part 460 firstly selects the candidate area which is set as having a higher priority by the priority setting part 450, and sets T candidate areas as the focus area. The candidate area selection part 460 provides the blur processing section 490 with focus area information indicating the set focus area.

Although the focus area setting section 411 is configured to include the object database 421, the focus area setting section 411 may be configured to not include the object database 421. For example, it is possible that an object database is provided to the exterior of the image capturing apparatus 100 and the focus area setting section 411 accesses the object database. In a similar manner, the object information registration portion 451 may be provided to the exterior of the focus area setting section 411.

Although the focus area setting section 411 includes the priority setting part 450, the focus area setting section 411 may be configured to not include the priority setting part 450. In this case, the candidate area selection part 460 may be configured to set the entire object areas as the focus area without limiting the number of the focus areas, and the number of the focus areas may be limited to T. When the priority setting part 450 is not included in the focus area setting section 411 and the number of the focus areas is limited to a value less than or equal to T, if the number of the candidate areas is greater than T, then the candidate area selection part 460 may select T areas of the object at random.

[Operation Example of Image Processing Device]

An operation example of the image processing device according to the third embodiment will be described with reference to FIG. 18. FIG. 18 is a flowchart illustrating an example of a focus area setting process according to the third embodiment. In the focus area setting section 411, the object recognition portion 422 recognizes an object in an image with reference to the object database 421 and sets an area of the object as a candidate area (step S921). The priority setting part 450 sets a higher priority to a candidate area similar to an image of the registered object (step S922). The candidate area selection part 460 determines whether or not the number of the candidate areas is greater than T (step S923). If the number of the candidate areas is greater than T (step S923: Yes), then the candidate area selection part 460 selects T candidate areas based on the priority (step S924).

If the number of the candidate areas is less than or equal to T (step S923: No) or after performing step S924, the candidate area selection part 460 sets each candidate area as a focus area (step S925). After performing step S925, the focus area setting section 411 terminates the focus area setting process.

As described above, according to the third embodiment, the focus area setting section 411 recognizes an object in an image and sets an area of the object as a focus area. The depth information acquisition section 480 generates depth information. The blur processing section 490 selects a depth difference minimum value for each pixel based on the depth information and calculates a filter order from the depth difference minimum value, thereby performing a blur process. Thus, the image processing device 400 can independently set the focus area even when a user does not set a focus area.

4. Fourth Embodiment

[Configuration Example of Image Processing Device]

Figure 19:
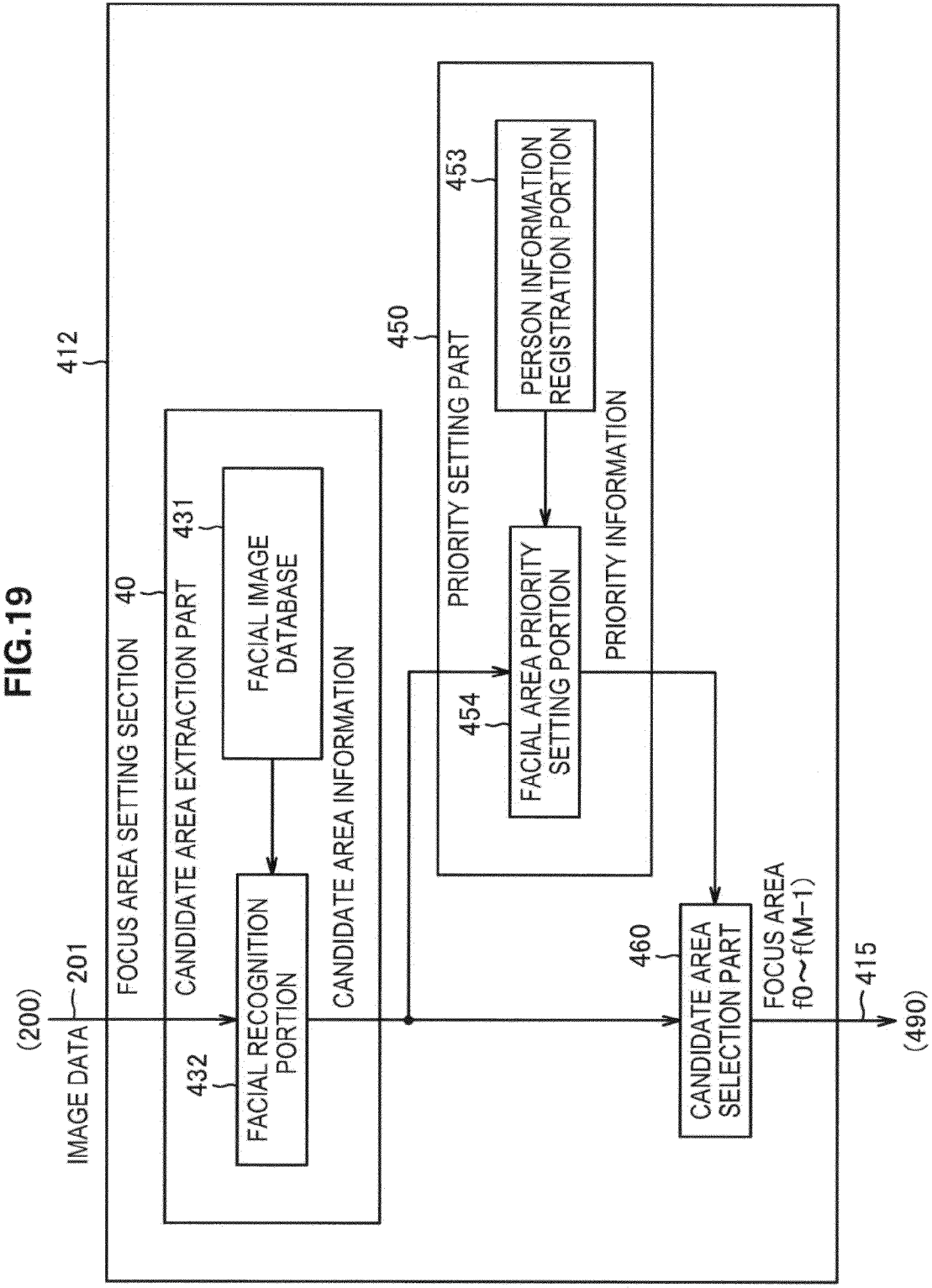
FIG. 19 is a block diagram illustrating a configuration example of a focus area setting section according to a fourth embodiment.
Figure 21:
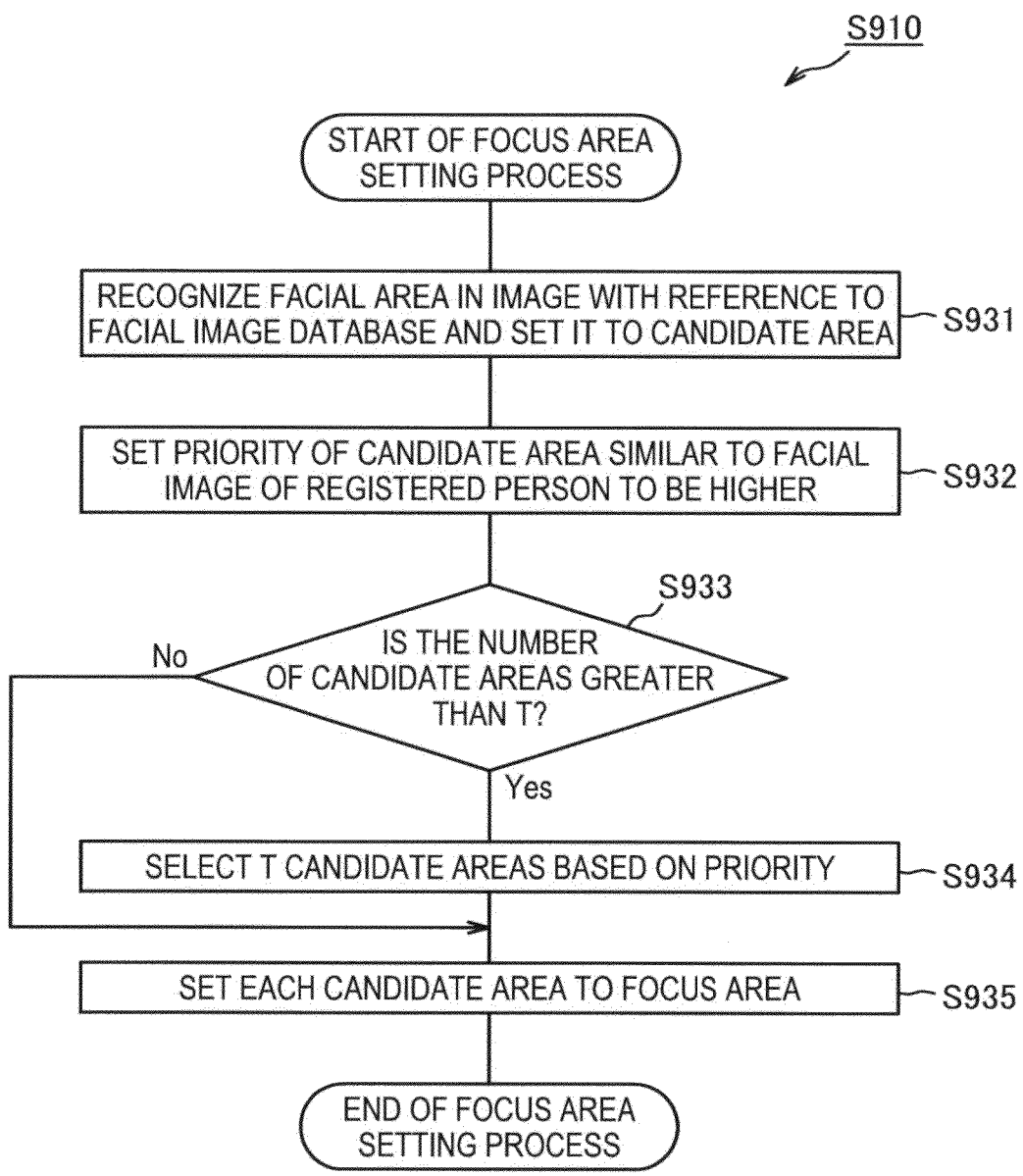
FIG. 21 is a flowchart illustrating an example of a focus area setting process according to the fourth embodiment.

A fourth embodiment of the present disclosure will be described with reference to FIG. 19 to FIG. 21. FIG. 19 is a block diagram illustrating a configuration example of a focus area setting section 412 according to the fourth embodiment. The focus area setting section 412 differs from the focus area setting section 410 of the first embodiment in that the focus area setting section 412 recognizes a plurality of faces in an image and sets each area of these faces as a focus area. The focus area setting section 412 includes a candidate area extraction part 430, a priority setting part 450, and a candidate area selection part 460.

The candidate area extraction part 430 of the fourth embodiment differs from the candidate area extraction part 420 of the third embodiment in that the candidate area extraction part 430 recognizes a face instead of an object. The candidate area extraction part 430 includes a facial image database 431 and a facial recognition portion 432.

The facial image database 431 is a database which stores information for recognizing a face in an image. The facial image database 431 stores, for example, facial image data of different people, data numerically indicating features of facial parts, metadata such as gender or age of the people, or the like.

The facial recognition portion 432 recognizes a plurality of faces in an image with reference to the facial image database 431. The facial recognition portion 432 sets each area of the recognized faces as a candidate area.

The priority setting part 450 of the fourth embodiment differs from the priority setting part 450 of the third embodiment in that the priority setting part 450 of the fourth embodiment gives a higher priority to a candidate area similar to a facial image of a particular person. The priority setting part 450 of the fourth embodiment includes a person information registration portion 453 and a facial area priority setting portion 454.

The person information registration portion 453 registers person information relative to a person whose priority is to be changed in selecting. The person information includes facial image data of a particular person, metadata such as gender or age of the person, or the like.

The facial area priority setting portion 454 sets the priority to each candidate area. For example, the facial area priority setting portion 454 recognizes the registered person and sets the priority of a candidate area similar to a facial image of the recognized person to be higher than other candidate areas.

The candidate area selection part 460 of the fourth embodiment is similar to the candidate area selection part 460 of the third embodiment.

The facial image database 431 and the person information registration portion 453 may be provided to the exterior of the focus area setting section 412.

Although the focus area setting section 412 includes the priority setting part 450, the focus area setting section 412 may be configured to not include the priority setting part 450.

Although the priority setting part 450 assigns a higher priority to a candidate area similar to the facial image of the registered person, the priority setting part 450 may assign a lower priority to the candidate area similar to the facial image of the registered person.

FIG. 20 is a diagram illustrating an example of image data before and after blurring according to the fourth embodiment. FIG. 20(a) is a diagram illustrating an example of the image data before blurring. This image data includes facial areas 631 and 633 and subjects of trees 632 and 634. The focus area setting section 412 recognizes the facial areas 631 and 633 and sets each facial area as a focus area. The blur processing section 490 performs the blur process in accordance with the depth difference minimum value.

FIG. 20(b) is a diagram illustrating an example of the image data after blurring. The blur process is not performed on the subjects 641 and 643 containing facial areas corresponding to the facial areas 631 and 633. The subject 641 contains other parts of the body in addition to the face, and the subject 643 contains other parts of body and a car in addition to the face. Since the other parts of the bodies and the car are substantially identical in depth to the faces, the blur process is not performed on the other parts of the bodies and the car. On the other hand, the blur process is performed on subjects 642 and 644 corresponding to the subjects of trees 632 and 634 in accordance with the depth difference minimum values.

[Operation Example of Image Processing Device]

An operation example of the image processing device 400 according to the fourth embodiment will be described with reference to FIG. 21. FIG. 21 is a flowchart illustrating an example of a focus area setting process according to the fourth embodiment. In the focus area setting section 412, the facial area recognition portion 432 recognizes a facial area in an image with reference to the facial image database 431 and sets the facial area as a focus area (step S931). The priority setting part 450 assigns a higher priority to a candidate area similar to the facial image of the registered person (step S932). Step S933 to step S935 are performed similarly to the step S923 to step S925 in the third embodiment.

As described above, according to the fourth embodiment, the focus area setting section 412 recognizes a facial area in an image and sets the facial area as a focus area. The depth information acquisition section 480 generates depth information. The blur processing section 490 selects a depth difference minimum value for each pixel based on the depth information and calculates a filter order from the depth difference minimum value, thereby performing a blur process. Thus, the image processing device 400 can independently set the focus area even when a user does not set a focus area.

5. Fifth Embodiment

[Configuration Example of Image Processing Device]

Figure 22:
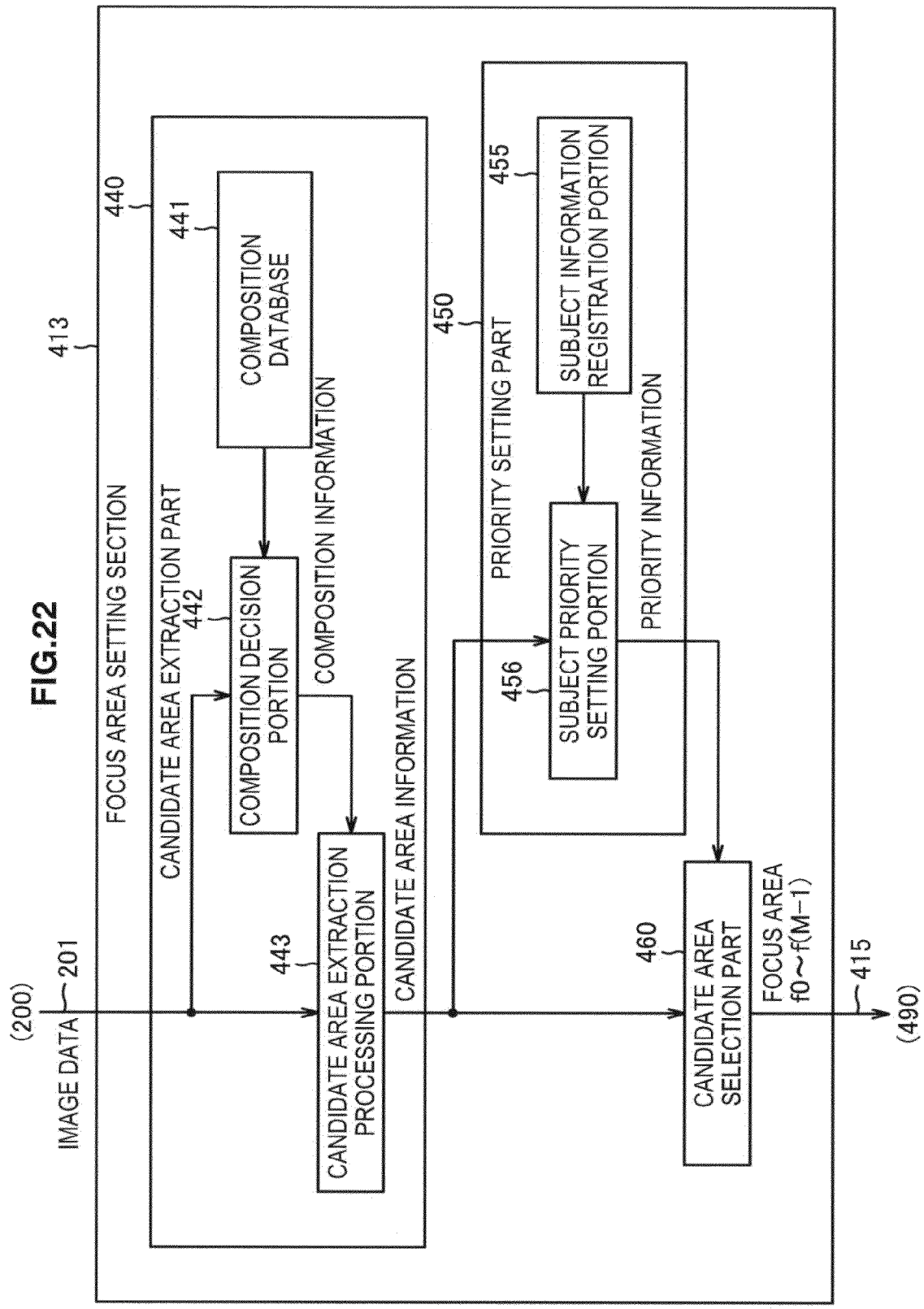
FIG. 22 is a block diagram illustrating a configuration example of a focus area setting section according to a fifth embodiment.

A fifth embodiment of the present disclosure will be described with reference to FIG. 22 to FIG. 25. FIG. 22 is a block diagram illustrating a configuration example of a focus area setting section 413 according to the fifth embodiment. The focus area setting section 413 differs from the focus area setting section 410 of the first embodiment in that the focus area setting section 413 sets the focus area based on a composition.

A candidate area extraction part 440 of the fifth embodiment differs from the candidate area extraction part 420 of the third embodiment in that the candidate area extraction part 440 extracts a candidate area based on the composition. The candidate area extraction part 440 includes a composition database 441, a composition decision portion 442, and a candidate area extraction processing portion 443.

The composition database 441 stores information associated with various compositions such as the rule of thirds composition, a pattern composition, and a radial composition. For example, the composition database 441 stores an arrangement pattern in an image of composition components forming the composition, a name of the composition, and so on. The composition components include a subject such as an object or a face, and a line segment detected by edge detection.

The composition decision portion 442 decides a composition. The composition decision portion 442 may detect a subject or a line segment in an image and select the composition which most closely matches the shape or arrangement of the subject, thereby deciding a composition for the image. The composition decision portion 442 provides the candidate area extraction processing portion 443 with composition information indicating the decided composition. The composition decision portion 442 may decide the composition in accordance with the user's operation.

The candidate area extraction processing portion 443 extracts an area of the main subject in the decided composition as a candidate area. The candidate area extraction processing portion 443 generates candidate area information indicating the extracted candidate area and provides the candidate area information to the priority setting part 450 and the candidate area selection part 460.

The priority setting part 450 of the fifth embodiment differs from the priority setting part 450 of the third embodiment in that the priority setting part 450 of the fifth embodiment sets the priority of the areas forming various subjects such as an object or a face. The priority setting part 450 of the fifth embodiment includes a subject information registration portion 455 and a subject priority setting portion 456.

The subject information registration portion 455 registers subject information relative to the subject whose priority is to be changed in selecting. Specifically, the subject information may be image data of a particular subject, a name of a subject, or the like.

The subject priority setting portion 456 sets the priority of each candidate area. For example, the subject priority setting portion 456 sets the priority of candidate area similar to the image of the recognized subject to be higher than that of the candidate area which is not similar to the image of the recognized subject. Alternatively, the subject priority setting portion 456 may set the priority of candidate area similar to the image of the recognized subject to be lower.

The candidate area selection part 460 of the fifth embodiment is similar to the candidate area selection part 460 of the third embodiment.

The focus area setting section 413 may be provided to the exterior of the composition database 441 and the subject information registration portion 455.

Although the focus area setting section 413 includes the priority setting part 450, the focus area setting section 413 may be configured to not include the priority setting part 450.

FIG. 23 illustrates examples of image data before and after blurring when the rule of thirds composition is set, in accordance with the fifth embodiment. FIG. 23(*a*) illustrates an example of image data before blurring 650. In the image data 650, subjects 651 to 654 are captured. FIG. 23(*b*) illustrates an example of the image data 650 when the rule of thirds composition is set.

The rule of thirds composition is a composition in which an image is equally divided into nine parts by two horizontal lines and two vertical lines which are drawn at regular intervals and main subject is placed on the lines or intersection points of the horizontal and vertical lines. By employing the rule of thirds composition, it is possible to attain a well-balanced artistic image.

It is assumed that the composition decision portion 442 selects any one of the rule of thirds composition and the pattern composition. It is assumed that the subjects 651 to 654 are different in shape. In this case, the rule of thirds composition is selected because the pattern composition is not suitable. In the rule of thirds composition, intersection points PP1 to PP4 are set. As shown in FIG. 23(*b*), the subjects 651 and 654 are both not located at any intersection point. On the other hand, the subject 652 is located at the intersection point PP2 and the subject 653 is located at the intersection point PP3. Thus, the subjects 652 and 653 are determined as main subjects for the composition and each subject is set as a focus area.

FIG. 23(*c*) illustrates an example of an image data after blurring 660. Subjects 661 to 664 in the image data 660 correspond to the subjects 651 to 654 in the image data before blurring 650, respectively. Because each of the subjects 652 and 653 is set as a focus area, the blur process is not performed on subjects 662 and 663 respectively corresponding to these subjects 652 and 653. On the other hand, the blur process is performed on subjects 661 and 664 in accordance with the depth difference minimum value.

FIG. 24 illustrates examples of focus area information and image data before and after blurring when the pattern composition is set, in accordance with the fifth embodiment. FIG. 24(*a*) illustrates an example of image data before blurring 670. Subjects 671 to 674 are captured in the image data 670.

The pattern composition is a composition for setting the subjects which are regularly arranged in an image and similar to each other in shape as a main subject. It is possible to attain a rhythmic image by employing the pattern composition. For example, in FIG. 24(*a*), subjects 671 to 674 are arranged regularly. The subjects 671, 672 and 674 have a similar shape. In this case, because there are the subjects 671, 672 and 674 which are regularly arranged and similar to each other in shape, the pattern composition is selected. Thus, the subjects 671, 672 and 674 are determined as main subjects for the composition and each subject is set as a focus area.

FIG. 24(*b*) illustrates focus area information 680. In FIG. 24(*b*), the pixel value of the white area is zero (0) and the pixel value of the gray area is one (1). In the focus area information 680, focus areas 681, 682 and 684 respectively corresponds to the subjects 671, 672 and 674 which each are set as the focus area in the image data 670. As shown in FIG. 24(*b*), the pixel value of pixel in the focus area is set to zero (0), the pixel value of pixel of other area is set to one (1).

FIG. 24(*c*) illustrates an image data after blurring 690. Subjects 691 to 694 in image data 690 respectively corresponds to the subjects 671 to 674 in the image data 670. Because each of the subjects 671, 672 and 674 is set as a focus area, the blur process is not performed on subjects 691, 692 and 694 respectively corresponding to the subjects 671, 672 and 674. On the other hand, the subject 693 is not set as the focus area, thus the blur process is performed on the subject in accordance with the depth difference minimum value.

[Operation Example of Image Processing Device]

Figure 25:
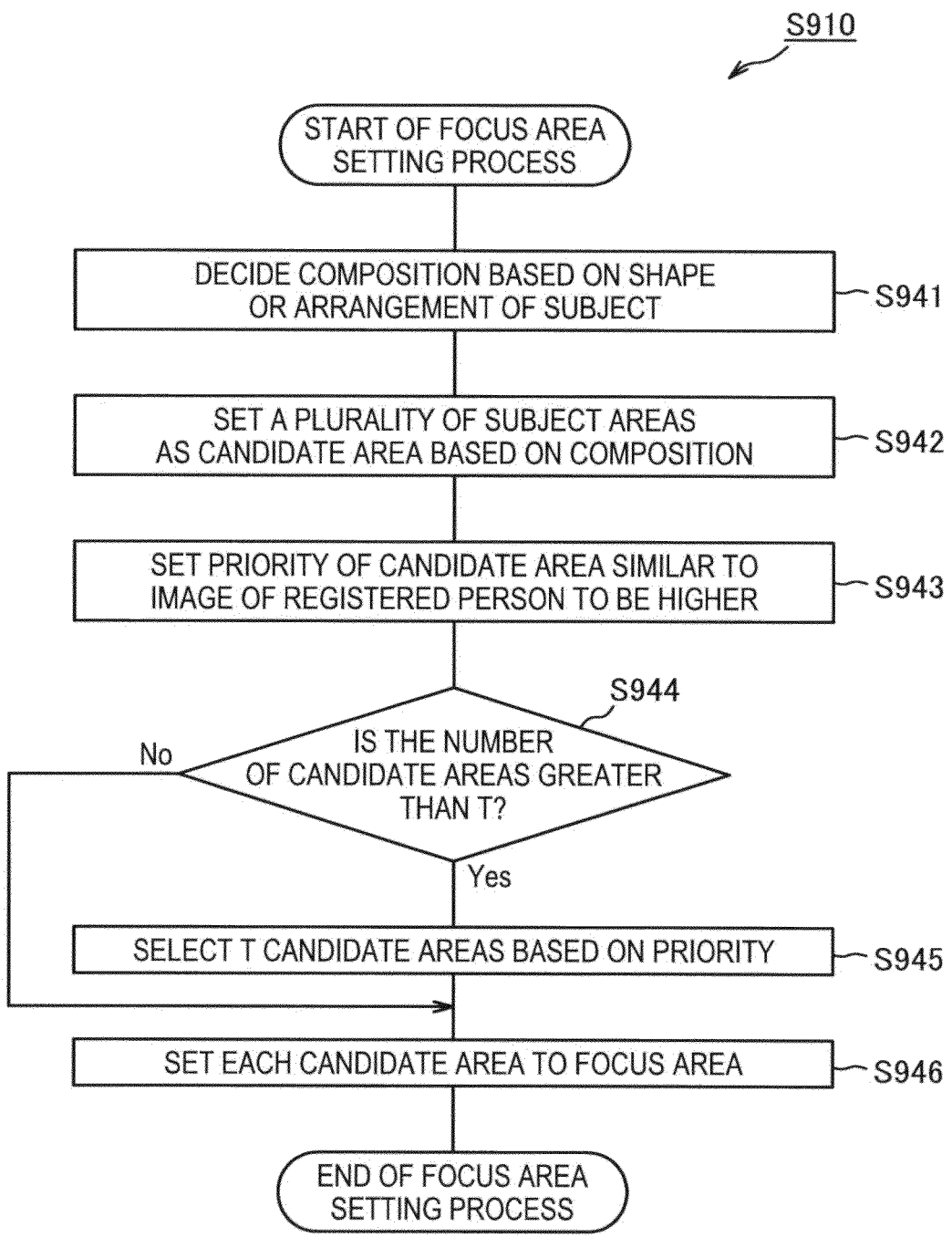
FIG. 25 is a flowchart illustrating an example of a focus area setting process according to the fifth embodiment.

An operation example of the image processing device according to the fifth embodiment will be described with reference to FIG. 25. FIG. 25 is a flowchart illustrating an example of a focus area setting process according to the fifth embodiment. In the focus area setting section 413, the composition decision portion 442 decides a composition based on the shape or arrangement of the subject in an image (step S941). The candidate area extraction processing portion 443 sets each of a plurality of subject areas as a candidate area based on the composition (step S942). The priority setting part 450 sets a higher priority to the candidate area similar to the image of the registered subject (step S943). Step S944 to step S946 are performed similarly to the step S923 to step S925 in the third embodiment.

As described above, according to the fifth embodiment, the focus area setting section 413 decides a composition and sets the focus area based on the composition. The depth information acquisition section 480 generates depth information. The blur processing section 490 selects a depth difference minimum value for each pixel based on the depth information and calculates a filter order from the depth difference minimum value, thereby performing a blur process. Thus, the image processing device 400 can independently set the focus area even when a user does not set a focus area.

It should be understood by those skilled in the art that various modifications, combinations, sub-combinations and alterations may occur depending on design requirements and other factors insofar as they are within the scope of the appended claims or the equivalents thereof.

In addition, the process procedures in the above-described embodiments may be grasped as a method including the series of procedures, and may be grasped as a program for enabling a computer to execute the series of procedures or a recording medium storing the program thereon. The recording medium may use, for example, a CD (Compact Disc), an MD (Mini Disc), a DVD (Digital Versatile Disk), a memory card, a Blu-ray Disc (registered trademark), or the like.

Additionally, the present technology may also be configured as below.

(1) An image processing device including:
a focus area setting section for setting each of a plurality of areas that are to be kept in focus in a captured image of a subject as a focus area;
a depth acquisition section for acquiring a depth of the subject in relation to each pixel in the image; and
a blur processing section for setting each pixel in the image as a target pixel and for performing a blur process on the target pixel in accordance with a minimum value of each depth difference absolute value between depth corresponding to the target pixel and depth corresponding to each of the focus area.

(2) The image processing device according to (1),
wherein the focus area setting section includes
a candidate area extraction part for extracting each of a plurality of areas to be a candidate for the focus area in the image as a candidate area, and
a candidate area selection part for selecting a plurality of candidate areas among the extracted candidate areas and for setting each of the plurality of candidate areas as the focus area.

(3) The image processing device according to (2), wherein the candidate area extraction part recognizes a captured area of a given object in the image and extracts the area as the candidate area.

(4) The image processing device according to (2) or (3), wherein the candidate area extraction part recognizes a captured area of a face in the image and extracts the area as the candidate area.

(5) The image processing device according to any of (2) to (4), wherein the candidate area extraction part includes
a composition decision portion for deciding a composition to define an arrangement of the subject in the image, and
a candidate area extraction processing portion for extracting a plurality of areas as the candidate area based on the decided composition.

(6) The image processing device according to any of (2) to (5), wherein the focus area setting section further includes
a priority setting part for setting a priority for the selection of the candidate area to the extracted candidate area, and
wherein the candidate area selection part selects the candidate area based on the set priority.

(7) The image processing device according to (6), wherein the priority setting part registers a captured image of a given subject and sets the priority to the candidate area based on a similarity between the registered image and the candidate area.

(8) The image processing device according to (6) or (7), wherein the priority setting part sets the priority based on an area size of the candidate area.

(9) The image processing device according to any of (6) to (9), wherein the priority setting part sets the priority based on the depth corresponding to any one pixel in the candidate area.

(10) The image processing device according to (9), wherein the depth setting part sets the priority of the candidate area to be higher as the depth corresponding to any one pixel in the candidate area is closer to a maximum value or minimum value of the obtained depth.

(11) The image processing device according to any of (1) to (10),
wherein the image includes a criterion image and a reference image for using in the acquisition of the depth,
wherein the depth acquisition section includes
a parallax detection part for detecting a distance between any one pixel in the criterion image and a pixel, corresponding to the pixel in the criterion image, in the reference image as a parallax, and
a depth generation part for generating the depth in relation to the pixel in the criterion image based on the detected parallax, and
wherein the blur processing section performs the blur process on each of the pixels in the criterion image as the target pixel.

(12) The image processing device according to any of (1) to (11), wherein the blur processing section performs the blur process on the target pixel, the blur process being calculated by using the following expression:

$$\delta_j = D \times \Delta d_{j\_min} \times R / d_j$$

where $\delta_j$ is a degree of blur, D is an effective diameter of an image capturing apparatus by which the image is captured, $d_j$ is the depth corresponding to the target pixel, $\Delta d_{j\_min}$ is the minimum value, and R is an imaging magnification of the image.

(13) The image processing device according to any of (1) to (12), wherein the focus area setting section sets the focus area in accordance with an operation signal for specifying the focus area.

(14) The image processing device according to any of (1) to (13), wherein the focus area setting section sets the focus area by limiting the number of focus areas to be set to a value less than or equal to a threshold.

(15) A method of controlling an image processing device, including:
setting, by a focus area setting section, each of a plurality of areas that are to be kept in focus in a captured image of a subject as a focus area;
acquiring, by a depth acquisition section, a depth of the subject in relation to each pixel in the image; and
setting, by a blur processing section, each pixel in the image as a target pixel and performing a blur process on the target pixel in accordance with a minimum value of each depth difference absolute value between depth corresponding to the target pixel and depth corresponding to each of the focus area.

(16) A program for enabling a computer to execute a procedure, the procedure including:
setting, by a focus area setting section, each of a plurality of areas that are to be kept in focus in a captured image of a subject as a focus area;
acquiring, by a depth acquisition section, a depth of the subject in relation to each pixel in the image; and
setting, by a blur processing section, each pixel in the image as a target pixel and performing a blur process on the target pixel in accordance with a minimum value of each depth difference absolute value between depth corresponding to the target pixel and depth corresponding to each of the focus area.

The present disclosure contains subject matter related to that disclosed in Japanese Priority Patent Application JP 2011-142807 filed in the Japan Patent Office on Jun. 28, 2011, the entire content of which is hereby incorporated by reference.

What is claimed is:
1. An image processing device comprising:
circuitry configured to
set each of a plurality of areas that are to be kept in focus in a captured image of a subject as a focus area;
acquire a depth of the subject in relation to each pixel in the image; and
set each pixel in the image as a target pixel and perform a blur process on the target pixel in accordance with a minimum value of each depth difference absolute value between depth corresponding to the target pixel and depth corresponding to each of the focus areas.

2. The image processing device according to claim 1, wherein the circuitry is configured to:
   extract each of a plurality of areas to be a candidate for the focus area in the image as a candidate area; and
   select a plurality of candidate areas among the extracted candidate areas and set each of the plurality of candidate areas as the focus area.

3. The image processing device according to claim 2, wherein the circuitry is configured to recognize a captured area of a given object in the image and extract the area as the candidate area.

4. The image processing device according to claim 2, wherein the circuitry is configured to recognize a captured area of a face in the image and extract the area as the candidate area.

5. The image processing device according to claim 2, wherein the circuitry is configured to:
   decide a composition to define an arrangement of the subject in the image; and
   extract a plurality of areas as the candidate area based on the decided composition.

6. The image processing device according to claim 2, wherein the circuitry is configured to:
   set a priority for the selection of the candidate area to the extracted candidate area; and
   select the candidate area based on the set priority.

7. The image processing device according to claim 6, wherein the circuitry is configured to:
   register a captured image of a given subject; and
   set the priority to the candidate area based on a similarity between the registered image and the candidate area.

8. The image processing device according to claim 6, wherein the circuitry is configured to set the priority based on an area size of the candidate area.

9. The image processing device according to claim 6, wherein the circuitry is configured to set the priority based on the depth corresponding to any one pixel in the candidate area.

10. The image processing device according to claim 9, wherein the circuitry is configured to set the priority of the candidate area to be higher as the depth corresponding to any one pixel in the candidate area is closer to a maximum value or minimum value of the obtained depth.

11. The image processing device according to claim 1, wherein
   the image includes a criterion image and a reference image for using in the acquisition of the depth, and
   the circuitry is configured to
   detect a distance between any one pixel in the criterion image and a pixel, corresponding to the pixel in the criterion image, in the reference image as a parallax;
   generate the depth in relation to the pixel in the criterion image based on the detected parallax; and
   perform the blur process on each of the pixels in the criterion image as the target pixel.

12. The image processing device according to claim 1, wherein the circuitry is configured to perform the blur process on the target pixel, the blur process being calculated by using the following expression:

$$\delta_j = D \times d_{j\_min} \times R/d_j$$

where $\delta_j$ is a degree of blur, D is an effective diameter of an image capturing apparatus by which the image is captured, $d_j$ is the depth corresponding to the target pixel, $\Delta d_{j\_min}$ is the minimum value, and R is an imaging magnification of the image.

13. The image processing device according to claim 1, wherein the circuitry is configured to set the focus area in accordance with an operation signal for specifying the focus area.

14. The image processing device according to claim 1, wherein the circuitry is configured to set the focus area by limiting the number of focus areas to be set to a value less than or equal to a threshold.

15. A method of controlling an image processing device, comprising:
   setting, by circuitry, each of a plurality of areas that are to be kept in focus in a captured image of a subject as a focus area;
   acquiring, by the circuitry, a depth of the subject in relation to each pixel in the image; and
   setting, by the circuitry, each pixel in the image as a target pixel and performing a blur process on the target pixel in accordance with a minimum value of each depth difference absolute value between depth corresponding to the target pixel and depth corresponding to each of the focus area.

16. A non-transitory computer-readable medium including a program for enabling a computer to execute a procedure, the procedure comprising:
   setting, each of a plurality of areas that are to be kept in focus in a captured image of a subject as a focus area;
   acquiring a depth of the subject in relation to each pixel in the image; and
   setting each pixel in the image as a target pixel and performing a blur process on the target pixel in accordance with a minimum value of each depth difference absolute value between depth corresponding to the target pixel and depth corresponding to each of the focus area.

* * * * *